(12) United States Patent
Isobe

(10) Patent No.: US 7,966,296 B2
(45) Date of Patent: Jun. 21, 2011

(54) STORAGE SYSTEM, STORAGE CONTROLLER AND DATA COMPRESSION METHOD

(75) Inventor: Daisuke Isobe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 12/023,555

(22) Filed: Jan. 31, 2008

(65) Prior Publication Data

US 2008/0301164 A1    Dec. 4, 2008

(30) Foreign Application Priority Data

Jun. 1, 2007    (JP) ................................. 2007-146867

(51) Int. Cl.
*G06F 7/00* (2006.01)

(52) U.S. Cl. ....................................................... 707/661
(58) Field of Classification Search .................... 707/661
See application file for complete search history.

(56) References Cited

U.S. PATENT DOCUMENTS

| 5,883,588 A | 3/1999 | Okamura |
| 2003/0223097 A1* | 12/2003 | Sakai et al. ................... 358/471 |
| 2008/0025298 A1* | 1/2008 | Lev-Ran et al. .............. 370/389 |

FOREIGN PATENT DOCUMENTS

JP    946235 A    2/1997

* cited by examiner

*Primary Examiner* — Charles Rones
*Assistant Examiner* — Fazlul Quader
(74) *Attorney, Agent, or Firm* — Sughrue Mion, PLLC

(57) ABSTRACT

Provided are a storage system, a storage controller and a data compression method that will not deteriorate the performance of a storage system by adjusting the compression processing time required for compressing data. This storage controller includes a statistical information management unit for managing a throughput value decided based on statistical information of previously compressed file data as a system performance value, a mode setting unit for setting a compression mode of either a system performance priority mode that terminates compression of the file data and gives priority to system performance or a compression priority mode that gives priority to compression of the file data based on a comparison between a system performance target value preset as a target value and the system performance value, and a compression controller for compressing the file data based on the compression mode set with the mode setting unit.

13 Claims, 21 Drawing Sheets

FIG.3

| | 90A | 90B | 90C | 90D | 90E | 90F | 90G | 90H |
|---|---|---|---|---|---|---|---|---|
| | FILE NUMBER | COMPRESSION RATIO (%) | CURRENT COMPRESSION MODE | SUBSEQUENT COMPRESSION MODE | AVERAGE VALUE | COMPRESSION TARGET | PERFORMANCE VALUE | PERFORMANCE TARGET |
| | 1 | 10 | 8 | 8 | 10 | UNATTAINED | 110 | ATTAINED |
| | 2 | 20 | 8 | 6 | 15 | UNATTAINED | 110 | ATTAINED |
| | 3 | 30 | 6 | 6 | 20 | ATTAINED | 110 | ATTAINED |
| | 4 | 10 | 6 | 7 | 17.5 | UNATTAINED | 110 | ATTAINED |
| | 5 | 30 | 7 | 7 | 20 | ATTAINED | 110 | ATTAINED |
| B → | 6 | 15 | 8 | 8 | 19.1 | UNATTAINED | 110 | ATTAINED |
| | 7 | 20 | 7 | 7 | 19.3 | UNATTAINED | 110 | ATTAINED |
| | 8 | 30 | 6 | 6 | 20.625 | ATTAINED | 110 | ATTAINED |
| | 9 | 40 | 6 | 5 | 22.7 | ATTAINED | 110 | ATTAINED |
| A → | 10 | 30 | 5 | 3 | 24.5 | ATTAINED | 110 | ATTAINED |

90

COMPRESSION RATIO TARGET VALUE 20%
PERFORMANCE TARGET VALUE 100MB/s

FIG.4

| 91A | 91B | 91C | 91D | 91E | 91F | 91G | 91H |
|---|---|---|---|---|---|---|---|
| DATA NUMBER | COMPRESSION RATIO (%) | CURRENT COMPRESSION MODE | SUBSEQUENT COMPRESSION MODE | AVERAGE VALUE | COMPRESSION TARGET | PERFORMANCE VALUE | PERFORMANCE TARGET |
| 1 | 10 | 8.1 | 8.3 | 10 | UNATTAINED | 110 | ATTAINED |
| 2 | 20 | 8.3 | 6.5 | 15 | UNATTAINED | 110 | ATTAINED |
| 3 | 30 | 6.5 | 6.9 | 20 | ATTAINED | 110 | ATTAINED |
| 4 | 10 | 6.9 | 7.2 | 17.5 | UNATTAINED | 110 | ATTAINED |
| 5 | 30 | 7.2 | 7.6 | 20 | UNATTAINED | 110 | ATTAINED |
| 6 | 15 | 7.6 | 8.2 | 19.1 | UNATTAINED | 110 | ATTAINED |
| 7 | 20 | 8.2 | 7.8 | 19.3 | UNATTAINED | 110 | ATTAINED |
| 8 | 30 | 7.8 | 6.9 | 20.625 | ATTAINED | 110 | ATTAINED |
| 9 | 40 | 6.9 | 5 | 22.7 | ATTAINED | 110 | ATTAINED |
| 10 | 30 | 5 | 3.8 | 24.5 | ATTAINED | 110 | ATTAINED |

COMPRESSION RATIO TARGET VALUE 20%
PERFORMANCE TARGET VALUE 100MB/s

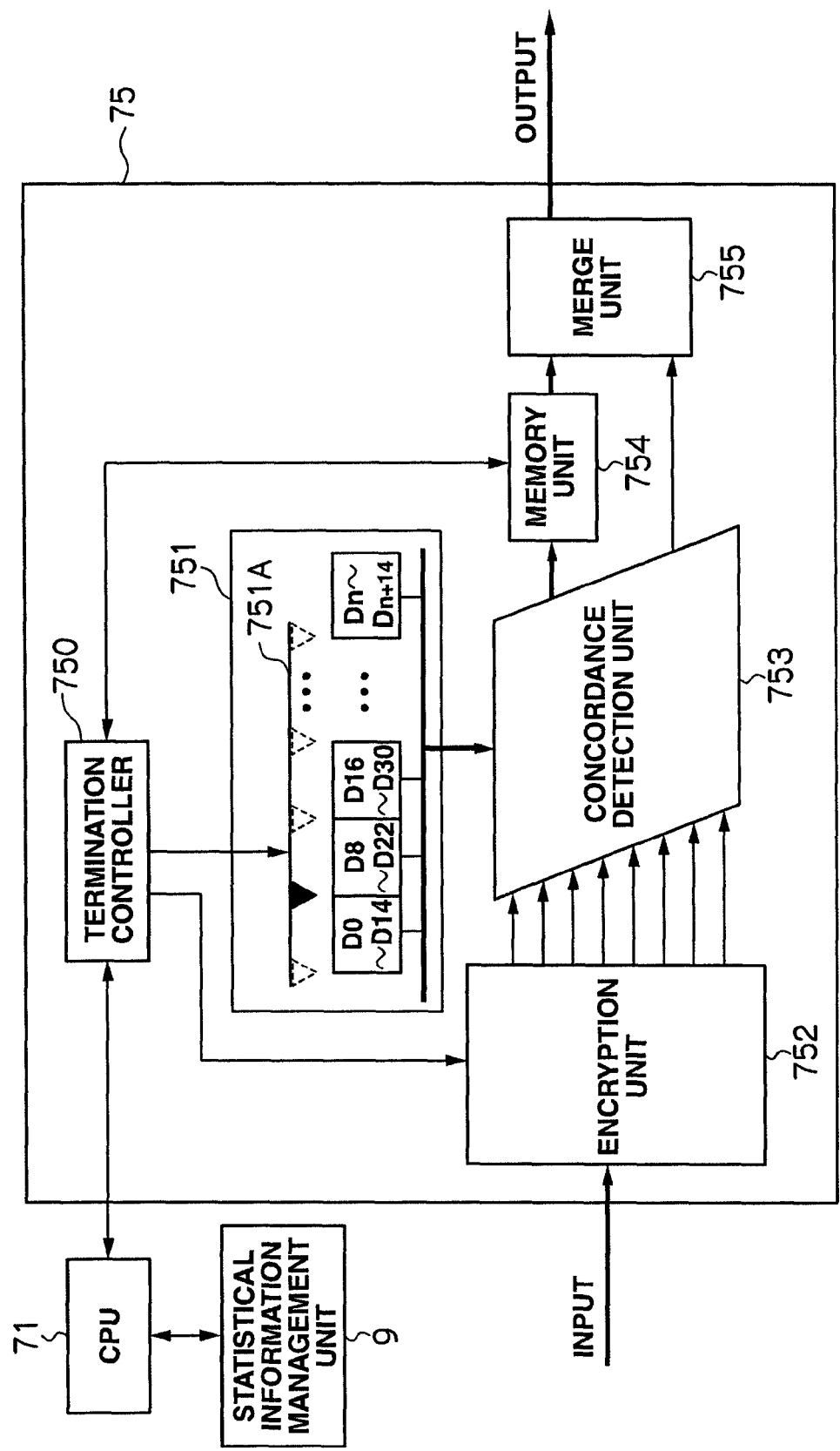

FIG.12

| 90A | 90B | 90C | 90D | 90E | 90F | 90G | 90H |
|---|---|---|---|---|---|---|---|
| FILE NUMBER | COMPRESSION RATIO (%) | CURRENT COMPRESSION MODE | SUBSEQUENT COMPRESSION MODE | AVERAGE VALUE | COMPRESSION TARGET | PERFORMANCE VALUE | PERFORMANCE TARGET |
| 1 | 10 | 8 | 8 | 10 | UNATTAINED | 110 | ATTAINED |
| 2 | 20 | 8 | 6 | 15 | UNATTAINED | 110 | ATTAINED |
| 3 | 30 | 6 | 6 | 20 | ATTAINED | 110 | ATTAINED |
| 4 | 10 | 7 | 5 | 17.5 | UNATTAINED | 90 | UNATTAINED |
| 5 | 30 | 5 | 5 | 20 | UNATTAINED | 90 | UNATTAINED |
| 6 | 15 | 4 | 4 | 19.1 | UNATTAINED | 90 | UNATTAINED |
| 7 | 20 | 7 | 7 | 19.3 | UNATTAINED | 90 | UNATTAINED |
| 8 | 30 | 6 | 6 | 20.625 | ATTAINED | 90 | UNATTAINED |
| 9 | 40 | 6 | 5 | 22.7 | ATTAINED | 90 | UNATTAINED |
| 10 | 30 | 5 | 1 | 24.5 | ATTAINED | 90 | UNATTAINED |

COMPRESSION RATIO TARGET VALUE 20%
PERFORMANCE TARGET VALUE 100MB/s

STORAGE SYSTEM, STORAGE CONTROLLER AND DATA COMPRESSION METHOD

CROSS REFERENCES

This application relates to and claims priority from Japanese Patent Application No. 2007-146867, filed on Jun. 1, 2007, the entire disclosure of which is incorporated herein by reference.

BACKGROUND

The present invention generally relates to a storage system, a storage controller and a data compression method, and in particular relates to technology for compressing and storing large volumes of data in a storage subsystem.

In recent years, a storage subsystem (storage controller) for controlling the input and output of data from a host system is used in a storage system that handles large volumes of data in order to store bulk data sent from the host system.

A storage subsystem manages a plurality of disk drives arranged in an array according to a RAID (Redundant Array of Independent Inexpensive Disks) configuration. At least one or more logical volumes (hereinafter referred to as "logical volumes") are formed in a physical storage area provided by the plurality of disk drives, and these logical volumes are provided to the host system.

Since this type of storage system handles large volumes of data, a data compression method of reducing the data volume and converting it into separate data while retaining the substantial property of data is being widely used.

As one data compression method there is a dictionary-type data compression method known as the LZ77 system. The data compression method that uses the LZ77 system utilizes a previously encrypted input data sequence as a dictionary, searches for a location of maximum concordance of the previously encrypted input data sequence and the consecutive portion in the input data sequence, and encrypts the location of concordance.

The LZ77 system has a history array for storing the encrypted input data sequence. An area referred to as a prefetch area of a fixed length is prepared in the history array, and data to be compressed is stored in this area. In the prefetch area, update of data is facilitated by migrating such data circularly pursuant to the progress of processing.

Since one problem that arises in using the LA77 system is the deterioration of the encryption processing speed, Japanese Patent Laid-Open Publication No. H9-46235 discloses technology of overcoming this problem by controlling the registration upon registering the search result of a character string in the history array with a search means.

SUMMARY

When encrypting data in addition to compressing data, since encryption is usually performed after data is compressed, the compression of data must be conducted in the storage subsystem.

Nevertheless, since much compression processing time will be required when the storage subsystem is to compress large volumes of data, the processing for storing the compressed data and throughput thereof will be affected when a given compression processing time is exceeded, and there is a problem in that the performance of the storage system will thereby deteriorate.

The present invention was made in view of the foregoing points. Thus, an object of the present invention is to propose a storage system, a storage controller and a data compression method that will not deteriorate the performance of a storage system by adjusting the compression processing time required for compressing data.

In order to achieve the foregoing object, the present invention provides a storage system comprising one or more storage controllers for storing file data to be compressed sent from a host system. The one or more storage controllers comprise a statistical information management unit for managing a throughput value decided based on statistical information of previously compressed file data as a system performance value, a mode setting unit for setting a compression mode of either a system performance priority mode that terminates compression of the file data and gives priority to system performance or a compression priority mode that gives priority to compression of the file data based on a comparison between a system performance target value preset as a target value and the system performance value, and a compression controller for compressing the file data based on the compression mode set with the mode setting unit.

Thereby, it is possible to adjust the compression processing time by adjusting the compression mode in the storage subsystem upon compressing data.

The present invention further provides one or more storage controllers for storing file data to be compressed sent from a host system. The one or more storage controllers comprise a statistical information management unit for managing a throughput value decided based on statistical information of previously compressed file data as a system performance value, a mode setting unit for setting a compression mode of either a system performance priority mode that terminates compression of the file data and gives priority to system performance or a compression priority mode that gives priority to compression of the file data based on a comparison between a system performance target value preset as a target value and the system performance value, a concordance detection unit for detecting a location of concordance between an input data sequence obtained by encrypting the file data, and a dictionary data sequence as a previously encrypted input data sequence, and a termination controller for controlling termination of compression of the file data based on a comparison between the compression mode and the location of concordance.

Thereby, it is possible to adjust the compression processing time by adjusting the compression mode in the storage subsystem upon compressing data since the termination controller will perform control to terminate the compression of data.

The present invention additionally provides a data compression method of a storage system comprising one or more storage controllers for storing file data to be compressed sent from a host system. The one or more storage controllers comprise a statistical information management step of managing a throughput value decided based on statistical information of previously compressed file data as a system performance value, a mode setting step of setting a compression mode of either a system performance priority mode that terminates compression of the file data and gives priority to system performance or a compression priority mode that gives priority to compression of the file data based on a comparison between a system performance target value preset as a target value and the system performance value, and a compression control step of compressing the file data based on the compression mode set at the mode setting step.

Thereby, it is possible to adjust the compression processing time by adjusting the compression mode in the storage subsystem upon compressing data.

According to the present invention, since it is possible to adjust the compression processing time by adjusting the compression mode in the storage subsystem upon compressing data, deterioration in the storage system performance can be avoided.

DESCRIPTION OF DRAWINGS

FIG. 3 is a chart showing a file statistics table according to an embodiment of the present invention;

FIG. 4 is a chart showing a data statistics table according to an embodiment of the present invention;

FIG. 5 is a block diagram showing the configuration of a compression controller according to an embodiment of the present invention;

FIG. 12 is a chart showing a file statistics table when the performance is unattained according to an embodiment of the present invention;

DETAILED DESCRIPTION

(1) First Embodiment

(1-1) Storage System

Foremost, the storage system according to the present embodiment is explained.

Figure 1:
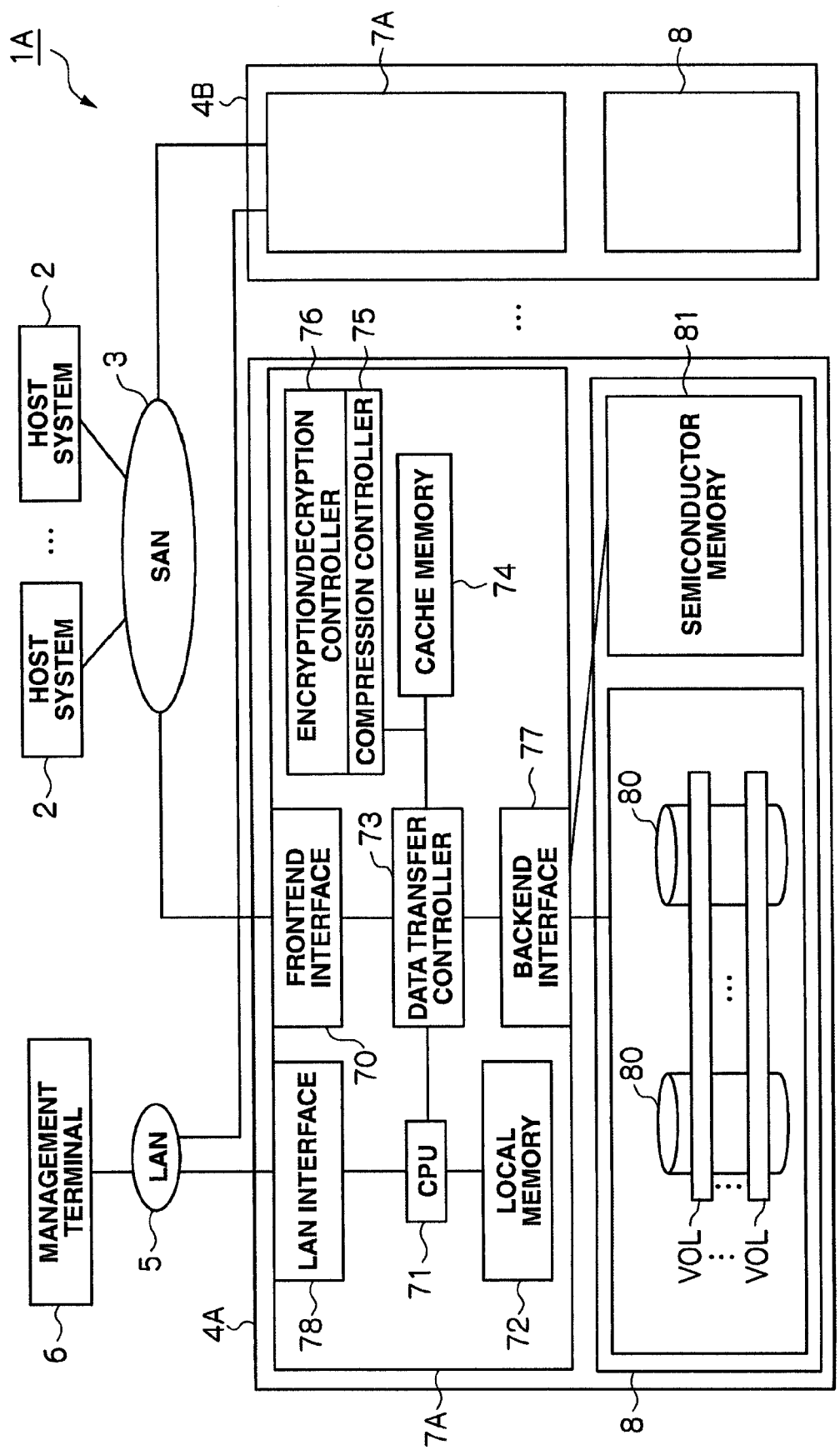
FIG. 1 is a block diagram showing the overall configuration of a storage system according to an embodiment of the present invention.

FIG. 1 shows the overall storage system 1A according to this embodiment.

The storage system 1A is configured by a plurality of host systems 2 being connected to a plurality of storage subsystems 4A, 4B via a SAN (Storage Area Network) 3, and a plurality of storage subsystems 4 being connected to a management terminal 6 via a LAN (Local Area Network) 5.

Unless it is necessary to differentiate the storage subsystems 4A, 4B, they will be collectively indicated as "storage subsystem 4" in the following explanation.

The host system 2 is a computer device comprising information processing resources such as a CPU (Central Processing Unit) and a memory, and, for instance, configured from a personal computer, a workstation, a mainframe or the like. Further, the host system 2 comprises an information input module (not shown) such as a keyboard, a switch, a pointing device, or a microphone, and an information output module (not shown) such as a monitor display or a speaker.

The storage subsystem 4A is a storage controller, and comprises a controller 7A and a memory module 8.

The controller 7A comprises a frontend interface 70, a CPU 71, a local memory 72, a data transfer controller 73, a cache memory 74, a compression controller 75, an encryption/decryption controller 76, a backend interface 77, and a LAN interface 78.

The controller 7A is able to control a plurality of hard disk drives 80 based on a RAID level (for instance, level 0, 1 or 5) defined in a so-called RAID system. In a RAID system, a plurality of hard disk drives 80 are managed as a single RAID group. A plurality of logical volumes VOL are defined in the RAID group as access units from the host system 2. A LUN (Logical Unit Number) is allocated to each logical volume VOL.

The frontend interface 70 is a controller for controlling the interface with the host system 2, and, for instance, has a function of receiving a block access request from the host system 2 based on a fibre channel protocol.

The CPU 71 is a processor that controls the write access or read access to a plurality of hard disk drives 80 and a semiconductor memory 81 in response to a data I/O request from the host system 2. Further, the CPU 71 is a processor that executes processing according to various commands sent from the management terminal 6 and processing of programs stored in the local memory 72.

The local memory 72 stores various types of data and program. The details will be described later.

The data transfer controller 73 connects the cache memory 74, the frontend interface 70, the backend interface 77, the compression controller 75, the encryption/decryption controller 76 and the CPU 71, and controls the data transfer between the host system 2 and the hard disk drives 80.

The cache memory 74 is a buffer memory for temporarily storing the write data to be written into the hard disk drives 80 or the semiconductor memory 81, or the read data to be read from the hard disk drives 80. The power source of the cache memory 74 is backed up, and is configured as a nonvolatile memory for preventing the loss of cache data even when a power failure occurs to the storage subsystem 4A.

The compression controller 75 is a controller for reading and compressing data temporarily stored in the cache memory 74. The compression controller 75 will be described in detail later.

The encryption/decryption controller 76 is a controller for reading the compressed data from the hard disk drives 80 or the semiconductor memory 81, and thereafter encrypting such data. Further, the encryption/decryption controller 76 is a controller for temporarily storing encrypted data sent from another storage subsystem 4 in the cache memory 74, and thereafter reading and decrypting the encrypted data from the cache memory 74.

The backend interface 77 is a controller for controlling the interface with the hard disk drives 80 or the semiconductor memory 81, and, for instance, has a function of controlling the data I/O requests to the hard disk drives 80 based on a protocol for controlling the hard disk drives 80.

The LAN interface 78 is an interface for connecting to the LAN, and controls the sending and receiving of data and control signals to and from the management terminal 6 based on TCP/IP.

The memory module 8 comprises a plurality of hard disk drives 80 and a semiconductor memory 81.

The hard disk drives 80 are storage devices configured from FC (Fibre Channel) disk drives, SATA (Serial Advanced Technology Attachment) disk drives, PATA (Parallel Advanced Technology Attachment) disk drives, FATA (Fibre Advanced Technology Attachment) disk drives, SAS (Serial Advanced SCSI) disk drives, SCSI (Small Computer System Interface) disk drives or the like.

The semiconductor memory 81 is a memory configured from a semiconductor device, and is a memory such as a non-volatile memory or a volatile memory.

The other storage subsystem 4B is a storage subsystem for remote copy. The other storage subsystem 4B is configured the same as the storage subsystem 4A, and the detailed explanation thereof is omitted. When the other storage subsystem 4B receives data that was compressed and encrypted with the storage subsystem 4A, it decrypts this data via the encryption/decryption controller 76, and stores the decrypted compressed data in the memory module 8.

When a write access is requested from the host system 2, the data transfer controller 73 foremost writes the data received from the host system 2 via the frontend interface 70 into the cache memory 74. Subsequently, the data transfer controller 73 compresses the write data with the compression controller 75 to obtain compressed data, and then transfers the compressed data to the backend interface 77 in order to perform asynchronous writing into the hard disk drives 80 or the semiconductor memory 81.

When a read access is requested from the host system 2, the data transfer controller 73 writes the compressed data read from the hard disk drives 80 or the semiconductor memory 81 via the backend interface 77 into the cache memory 74, encrypts the compressed data with the encryption/decryption controller 76, and transfers the encrypted compressed data to the frontend interface 70. The frontend interface 70 transfers the encrypted compressed data to the other storage subsystem 4B.

The management terminal 6, for instance, is a computer system comprising hardware resources such as a CPU, a memory and a display. By using the management terminal 6 to perform input operations, the user is able to send commands for managing the storage subsystem 4 to the storage apparatus 4. As commands for managing the storage subsystem 4, for instance, there is a command for increasing or decreasing the hard disk drives 80 or changing the RAID configuration, a command for installing the CPU's microprograms in the memory, and a command for confirming the operational status and specifying the defective portion of the storage subsystem 4.

(1-2) Configuration of Local Memory

The configuration to be stored in the local memory 72 is now explained.

Figure 2:
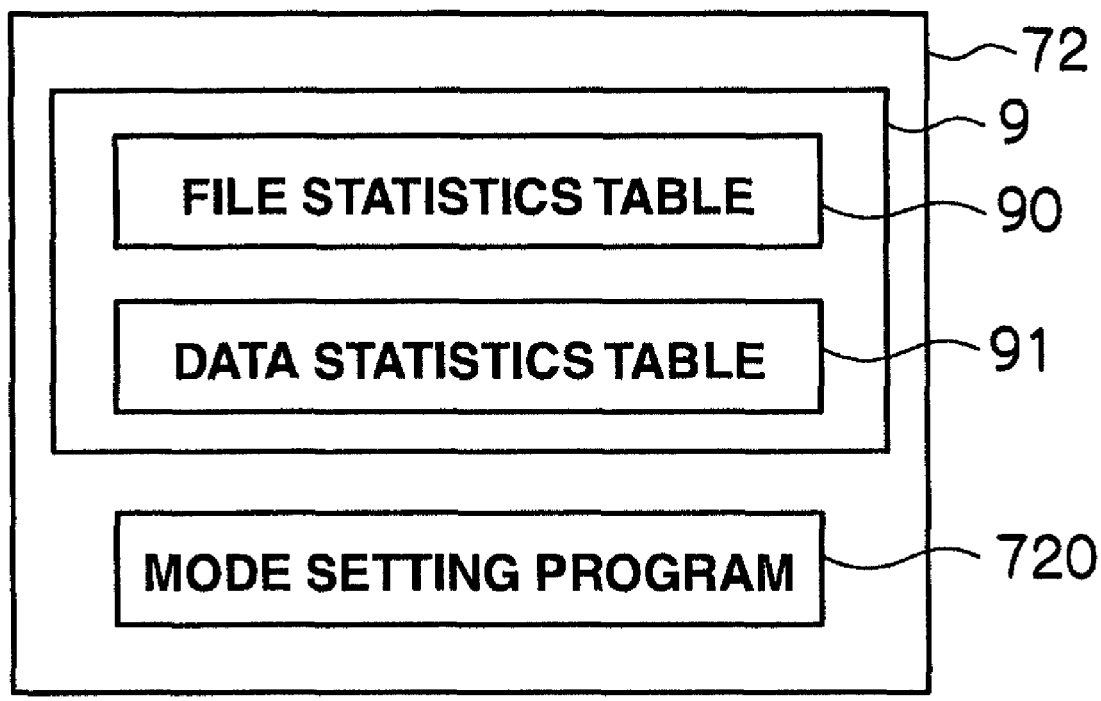
FIG. 2 is a diagram showing the contents of a local memory according to an embodiment of the present invention.

As shown in FIG. 2, the local memory 73 stores a statistical information management unit 9 for managing, as statistical information, the information of compressed data in past files, and a mode setting program 720 to be decided based on the statistical information.

The statistical information management unit 9 manages a file statistics table 90 and a data statistics table 91.

(1-2-1) File Statistics Table

As shown in FIG. 3, the file statistics table 90 is a table for storing, as statistical information, the compression information for each file sent from the host system 2 and performance information of the storage system 1A.

The file statistics table 90 is configured from a "file number" field 90A, a "compression ratio (%)" field 90B, a "current compression mode" field 90C, a "subsequent compression mode" field 90D, an "average value" field 90E, a "compression target" field 90F, a "performance value" field 90G, and a "performance target" field 90H.

The "file number" field 90A stores the file numbers of a plurality of files sent from the host system 2.

The "compression ratio (%)" field 90B stores compression ratio information of each file. A file compression ratio is a percentage obtained by dividing the file after compression with the file before compression.

The "current compression mode" field 90C stores compression mode values for compressing the current file. The compression mode, for instance, is set in stages from 1 to 8. The smaller the numerical value of the compression mode, higher priority is given to improving the performance of the storage system 1A, and larger the numerical value of the compression mode, higher priority is given to compression processing.

The "subsequent compression mode" field 90D stores compression mode values for compressing the subsequent file, which are values set based on the target value of the compression ratio set by the user and the average value of the compression ratios.

The "average value" field 90E stores the average value of the compression ratios.

The "compression target" field 90F stores information regarding whether the average value of the compression ratios has reached the target value of the compression ratio. "Attained" is displayed when the average value of the compression ratios has reached the target value of the compression ratio, and "Unattained" is displayed when the average value has not reached the target value.

The "performance value" field 90G stores values of the data transfer volume (throughput) per unit of time.

The "performance target" field 90H stores information regarding whether the current performance value has reached the performance target value set by the user. Incidentally, a performance target value is a value of the data transfer volume (throughput) per unit of time.

(1-2-2) Data Statistics Table

The data statistics table 91 is a table for storing, as statistical information, the compression information of arbitrary data that is a part of the file data, and the performance information of the storage system 1A.

As shown in FIG. 4, the data statistics table 91 is configured from a "data number" field 91A, a "compression ratio (%)" field 91B, a "current compression mode" field 91C, a "subsequent compression mode" field 91D, an "average value" field 91E, a "compression target" field 91F, a "performance value" field 91G and a "performance target" field 91H.

The "data number" field 91A stores data numbers of certain input data.

The "compression ratio (%)" field 91B stores compression ratio information of input data. A compression ratio of input data is the percentage obtained by dividing the input data after compression with the input data before compression.

The "current compression mode" field 91C stores compression mode values for compressing the input data. The compression mode in the data statistics table 91 enables a more detailed setting in comparison to the compression mode in the foregoing file statistical information 91. For example, with the compression mode in the data statistics table 91, for instance, levels 1 to 8 can be set up to one decimal place. When the compression mode of file "1" is "6," data in file "1" can be set to a more detailed mode of 6.0 to 6.9.

The "subsequent compression mode" field 91D stores compression mode values for compressing the subsequent input data, and are values to be set based on the target value of the compression ratio set by the user, and the average value of the compression ratios.

The "average value" field 91E, The "compression target" field 91F, the "performance value" field 91G and the "performance target" field 91H are similar to the "average value" field 91E, the "compression target" field 90F, the "performance value" field 90G and the "performance target" field 90H, and the detailed explanation thereof is omitted.

(1-3) Configuration of Compression Controller

Configuration of the compression controller 75 is now explained.

FIG. 5 is a block diagram showing the internal configuration of the compression controller 75.

The compression controller 75 is a controller for controlling the compression of an input data sequence using a dictionary-type data compression method.

Here, an input data sequence is a data sequence in which all data stored in one file are to be compressed when such one file is sent from the host system 2, and a data sequence obtained by dividing the input data sequence into several bytes is referred to as a partial data sequence.

The compression controller 75 is configured from a termination controller 750, a dictionary unit 751, an encryption unit 752, a concordance detection unit 753, a memory unit 754 and a merge unit 755.

The termination controller 750 communicates with the CPU 71, and controls a command for compressing the partial data sequence, a switching command for switching the address of the dictionary data sequences D0 to Dn+14 in the dictionary unit 751, and a termination command or an end-flag command for terminating the compression midway without completely compressing the partial data sequence.

Here, a dictionary data sequences D0 to Dn+14 refers to the previously encrypted input data sequence.

The termination controller 750 controls the concordance detection unit 753 according to the compression mode set based on the mode setting program 720.

The dictionary unit 751 has a dictionary data sequences D0 to Dn+14, and, by moving the address pointer 751A, the dictionary data sequences D0 to Dn+14 assembled for each arbitrary group is used as the target dictionary for comparison with the partial data sequence. Here, the address pointer 751A is moved for each 8 bit. By detecting the concordance of the dictionary data sequences D0 to Dn+14 assembled for each arbitrary group and the partial data sequences I0 to I7, it is possible to compress the location of concordance.

Incidentally, in the present embodiment, the dictionary data sequence is configured so that an 8-bit dictionary data sequence can be compared against a 1-bit partial data sequence. Here, the dictionary data sequence is set as one group for each D0 to D14, D8 to D15 . . . Dn to Dn+14 bit in relation to an 8-bit partial data sequences I0 to I7, but the grouping is not limited thereto. Further, since the data sequence is merely assembled for each arbitrary group in order to increase the processing speed of compression, it is also possible to compare the entire dictionary data sequences D0 to Dn+14 and the partial data sequence.

The encryption unit 752 encrypts the input data as an input data sequence, and stores the data sequence obtained by dividing the input data sequence into several bytes in a plurality of partial data sequences I0 to I7. The encryption unit 752 sends each partial data sequences I0 to I7 to the concordance detection unit 753.

Incidentally, in the present embodiment, although the input data sequence is data and the partial data sequences I0 to I7 divided for every 8 bits, but these may also be divided for every 16 bits, and the present invention is not limited to the numerical values exemplified in this embodiment.

The concordance detection unit 753 compares the dictionary data sequences D0 to D14, D8 to D15 . . . Dn to Dn+14 assembled for each arbitrary group and the partial data sequences I0 to I7, and detects the location of concordance as the location of compression. The concordance detection unit 753 outputs the concordance length as the location of compression, and the location information.

The memory unit 754 stores the maximum value of the concordance length and location as the location of maximum concordance, and the calculated value of the concordance length and location information calculated for each partial data sequence. The memory unit 754 sends the maximum value and the calculated value to the termination controller 750.

The merge unit 755 compresses the location of compression of the input data sequence detected by the concordance detection unit 753, and differentiates the location of non-compression as the input data sequence without change. The merge unit 755 combines the location of compression and the location of non-compression and outputs this as output data.

The specific hardware configuration of the concordance detection unit 753 is now explained.

Figure 6:
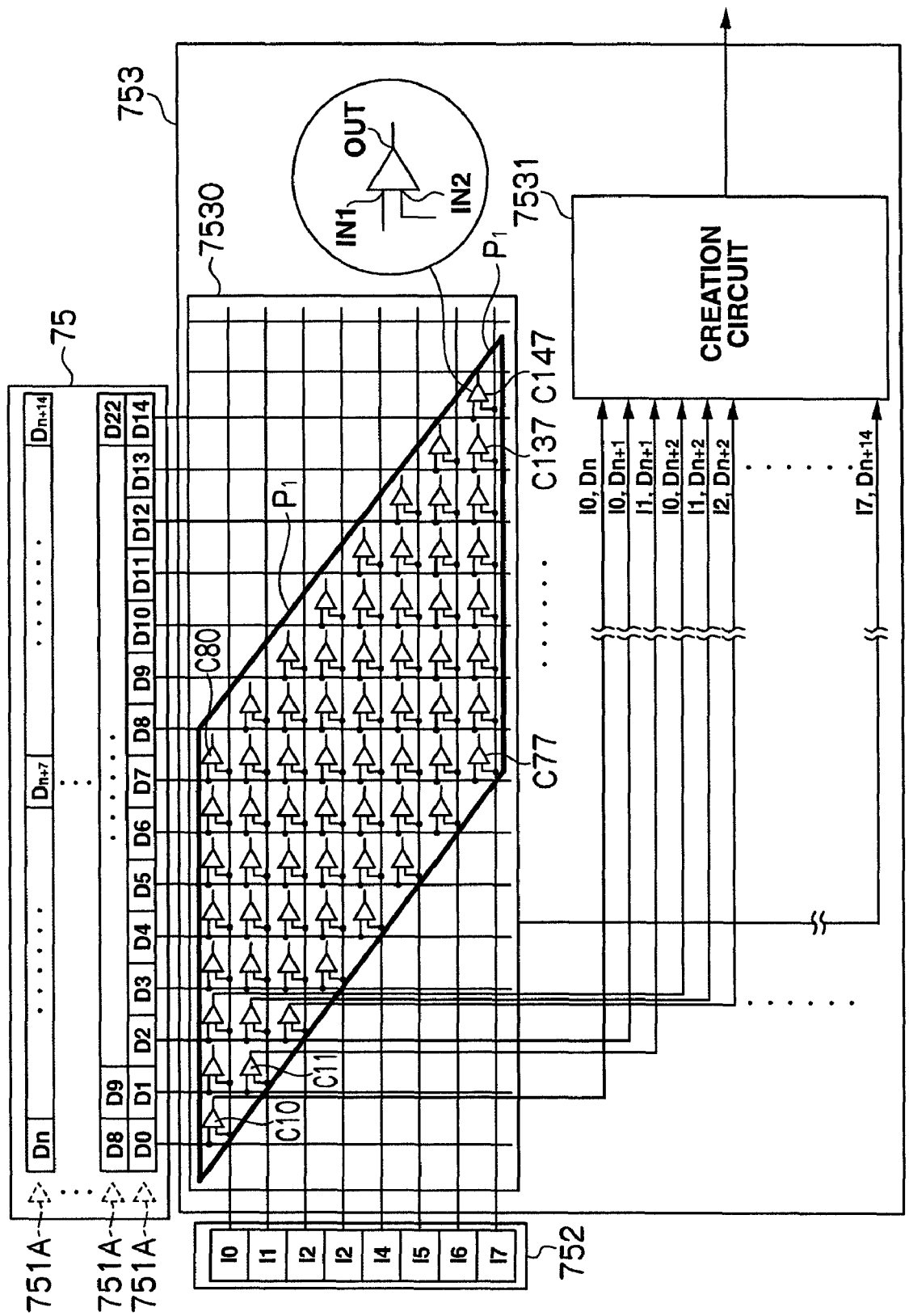
FIG. 6 is a configuration diagram showing the configuration of a compression controller according to an embodiment of the present invention.

FIG. 6 shows the hardware configuration of the concordance detection unit 753.

The concordance detection unit 753 comprises a comparator circuit 7530, and a creation circuit 7531 to be connected to the comparator circuit 7530.

The comparator circuit 7530 is a circuit in which the dictionary data sequences D0 to Dn+14 and the partial data sequences I0 to I7 are respectively connected to the input terminals IN1, IN2 of the comparators C00 to C147, and the result of concordance or non-concordance is output from the output terminal OUT A data range to be subject to a single comparison/compression for comparing a certain partial data sequences I0 to I7 and an arbitrary dictionary data sequences D0 to D14, D8 to D15 . . . Dn to Dn+14 is referred to as a page P.

The creation circuit 7531 is a circuit for creating a calculated value of the concordance length and location information based on the result output from the output terminal of the comparators C00 to C147.

Figure 7:
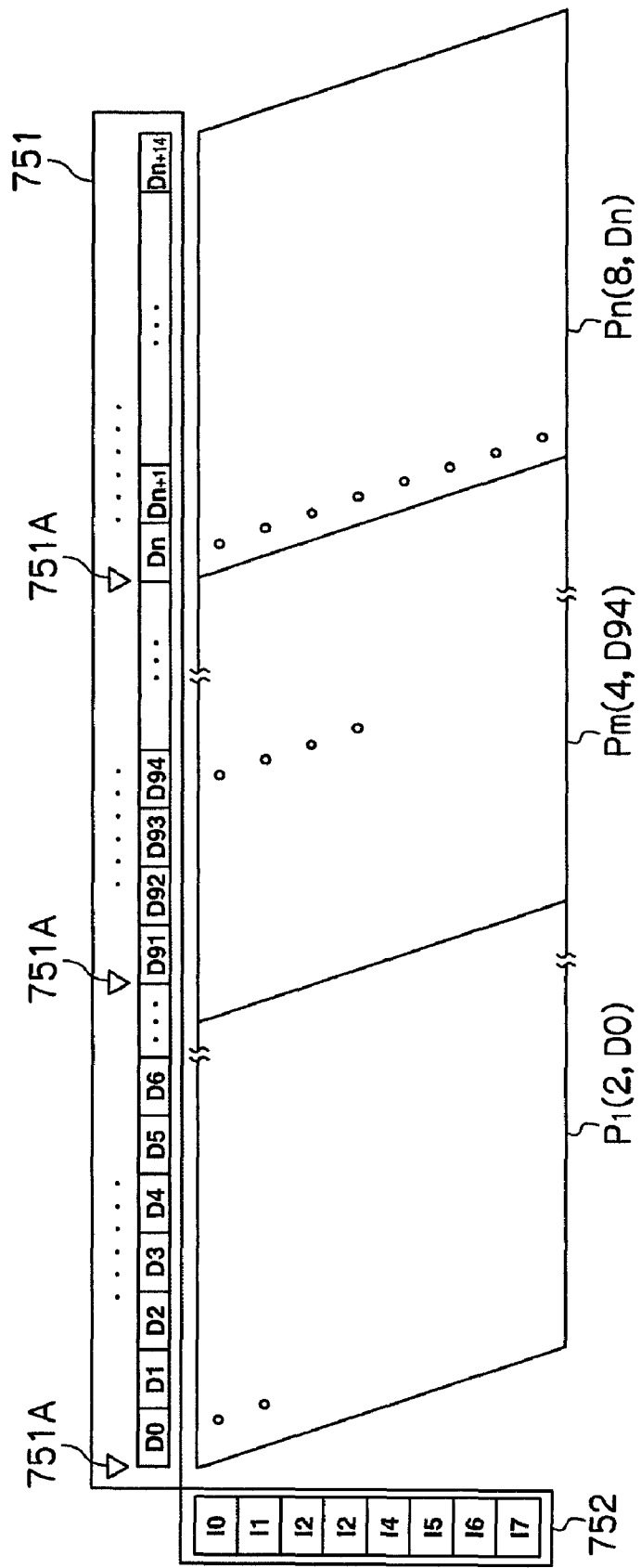
FIG. 7 is a conceptual diagram showing the comparison results in a compression controller according to an embodiment of the present invention.

FIG. 7 shows a conceptual diagram for creating a calculated value of the concordance length and location information.

For instance, the comparator circuit 7530 calculates the result upon comparing the dictionary data sequences D0 to D14 and the partial data sequences I0 to I7 in page P1. In page P1, it is shown that (I0, D0) and (I1, D0) are in concordance (indicated with a circle in the drawings). Similarly, in page Pm which compared a certain dictionary data sequence and the partial data sequences I0 to I7, it is shown that (I0, D94), (I1, D94), (I2, D94), (I3, D94) are in concordance. In addition, page Pn which compared a certain dictionary data sequence and the partial data sequences I0 to I7, it is shown that (I0 to I7, Dn) are in concordance.

Here, in the creation circuit 7531, the calculated value is decided such that the concordance length and location information on page P1 are (2, D0), the concordance length and location information on page Pm are (4, D94), and the concordance length and location information on page Pn are (8, Dn).

(1-4) Compression Mode Setting Processing of Data

The processing routine of performing the compression mode setting of data in the storage system 1A based on the foregoing configuration is now explained. This compression mode setting processing is executed by the CPU 71 based on the mode setting program 720.

Figure 8:
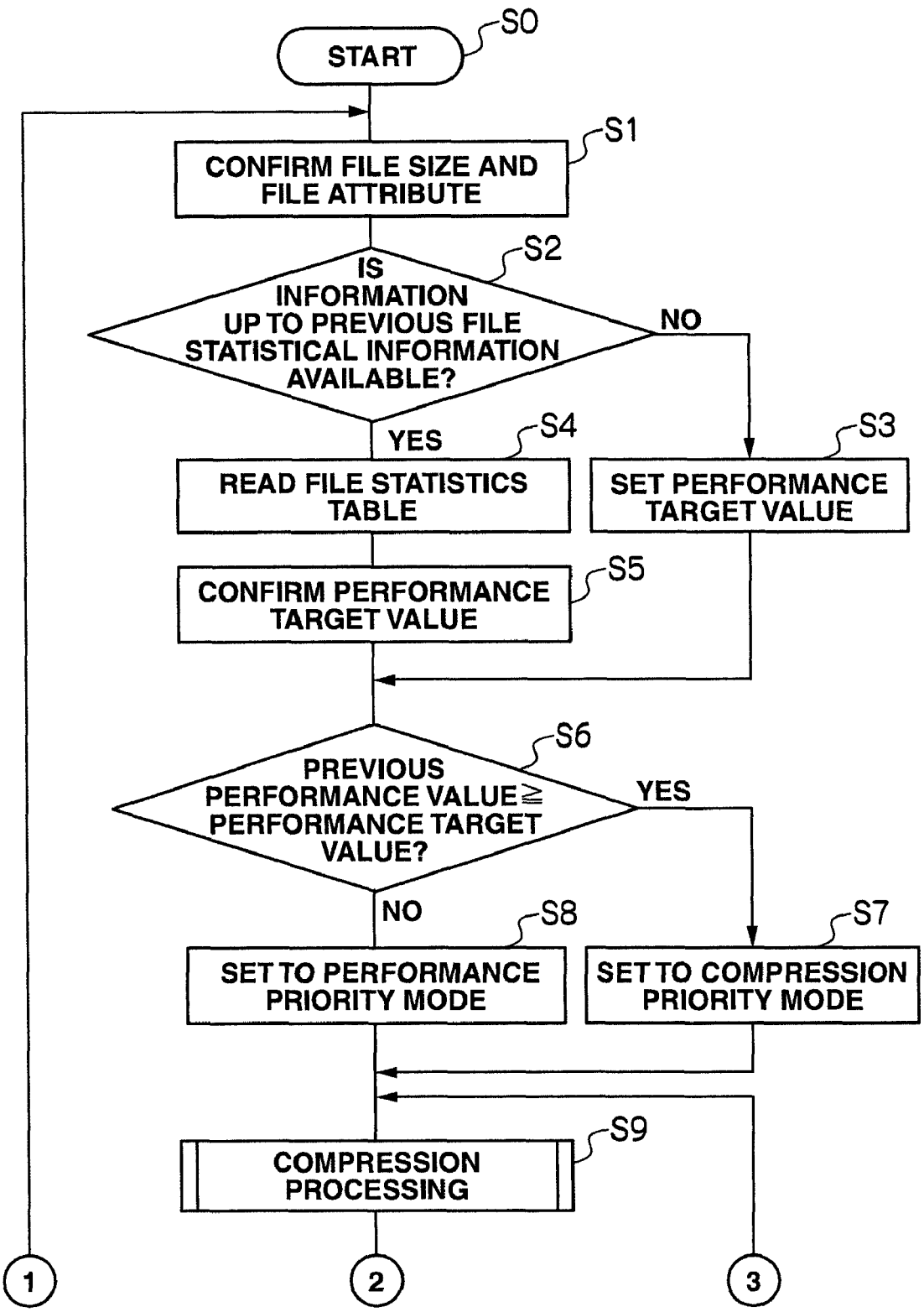
FIG. 8 is a flowchart of mode setting processing according to an embodiment of the present invention.
Figure 9:
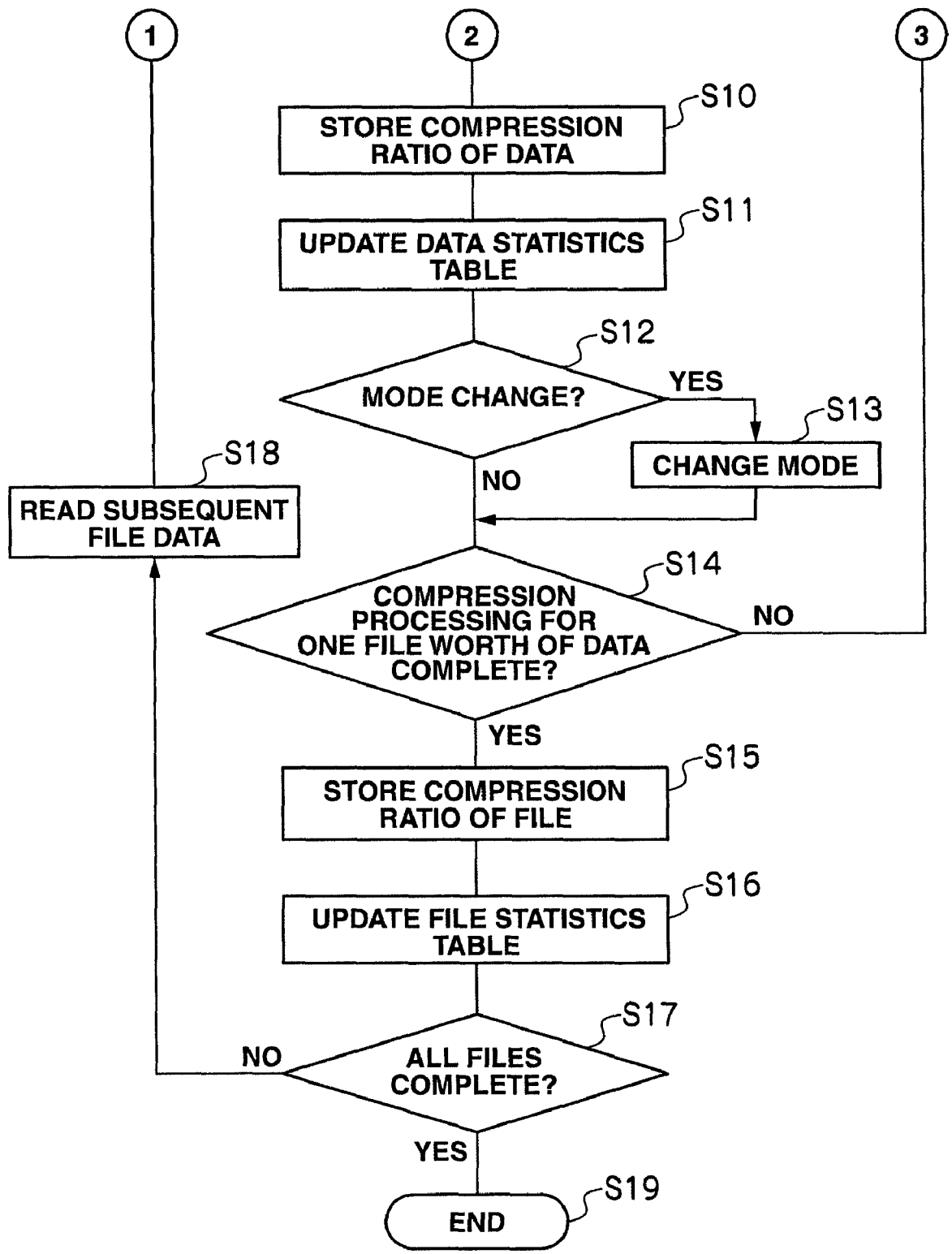
FIG. 9 is a flowchart of mode setting processing according to an embodiment of the present invention.

Specifically, as shown in FIG. 8 and FIG. 9, the CPU 71 starts the mode setting processing when all data (hereinafter referred to as "file data") in a file to be subject to data compression sent from the host system 2 is temporarily stored in the cache memory 74 (S0).

Subsequently, the CPU 71 confirms the file size and file attribute of the file data (S1). Here, a file attribute refers to the type of file, and, for instance, is a backup file, a text file, an image data file or the like.

After confirmation, the CPU 71 determines whether the file statistics table 90 possesses statistical information up to the previous file (S2). When the CPU 71 determines that there is no statistical information up to the previous file and is initial (S2: NO), it sets the performance target value of the storage system 1A (S3). The performance target value is a user setting.

Meanwhile, when the CPU 71 that the file statistics table 90 possesses statistical information up to the previous file (S2: YES), it reads the file statistics table 90 up to the previous file (S4). The CPU 71 thereafter refers to the file statistics table 90, and confirms the preset performance target value of the storage system 1A(S5).

The CPU 71 compares the performance target value and the performance value of the previous file in the file statistics table 90, and determines whether the performance value of the previous file is a value that exceeds the performance target value (S6).

For example, as shown in the file statistics table 90 of FIG. 3, let it be assumed that file number "10" is the previous file. Since the performance value here is 110 MB/s and the performance target value is 100 MB/s, "Attained" is displayed in the "performance target" field 90H of the file statistics table 90. Thus, in this case, the CPU 71 determines that the performance value of the previous file is value that exceeds the performance target value.

Incidentally, in the case of an initial setting, since the performance value will be the performance target value, the CPU 71 determines that the initially set performance value is the performance target value.

When the CPU 71 determines that the performance value of the previous file is a value that exceeds the performance target value (S6: YES), it sets the current compression mode concerning the file data to be subject to data compression as the compression priority mode (S7).

Here, a compression priority mode is a mode among the compression modes that gives priority to compressing the file data to be subject to data compression. The compression priority mode can be realized by setting the numerical value of the foregoing compression mode to a large value. For example, when the compression mode is set in 8 stages of 1 to 8, priority will be given to data compression by setting a large numerical value (5 to 8).

Meanwhile, when the CPU 71 determines that the performance value of the previous file is a value that is smaller than the performance target value (S6: NO), it sets the current compression mode concerning the file data to be subject to data compression as the performance priority mode (S8).

Here, a performance priority mode is a mode among the compression modes that gives priority to the performance of the storage system 1A by terminating the compression of file data to be subject to data compression midway. The performance priority mode can be realized by setting the numerical value of the foregoing compression mode to a small value. For example, when the compression mode is set in 8 stages of 1 to 8, priority will be given to improving the performance by terminating data compression midway by setting a small numerical value (1 to 4).

For example, as shown in the file statistics table 90 of FIG. 3, if file number "10" is the previous file, the subsequent compression mode will be "3." Therefore, since the compression mode of the file to be subject to the current data compression will be "3," the compression mode is set to the performance priority mode.

When the current compression mode is set to the compression priority mode or the performance priority mode (S7, S8), the CPU 71 sends the current compression mode to the termination controller 750 of the compression controller 75 and causes it to execute compression processing (S9). The compression controller 75 compresses the input data based on the received current compression mode.

The CPU 71 stores the compression ratio of the compressed input data (S10), adds the statistical information of the compressed input data to the data statistics table 91, and updates the contents of the data statistics table 91 (S11).

Here, the CPU 71 determines whether to change the compression mode of the "subsequent compression mode" 91D (S12). Here, contents of the "subsequent compression mode" field 91D are updated based on the method of deciding the subsequent compression mode. This decision method will be described later.

When the CPU 71 determines that the compression mode of the "subsequent compression mode" 91D should be changed (S12: YES), it changes the compression mode of the subsequent compression mode (S13), and then proceeds to step S14.

When the CPU 71 determines that the compression mode of the "subsequent compression mode" 91D should not be changed (S12: NO), it determines whether one file data worth of compression processing is complete (S14).

When the CPU 71 determines that one file data worth of compression processing is not complete (S14: NO), it returns to step S9 and executes compression processing once again to data to be compared.

Meanwhile, when the CPU 71 determines that one file data worth of compression processing is complete (S14: YES), it stores the compression ratio of the one compressed file (S15), adds the one compressed file to the file statistics table 90, and updates the contents of the file statistics table 90 (S16). Here, contents of the "subsequent compression mode" field 90D are updated based on the method of deciding the subsequent compression mode. This decision method will also be described later together with the decision method of the "subsequent compression mode" field 91D.

Subsequently, the CPU 71 determines whether the compression of all files sent from the host system 2 is complete (S17). When the CPU 71 determines that the compression of all files is not complete (S17: NO), it reads the subsequent file data (S18), and once again executes the mode setting processing from step S1.

Meanwhile, when the CPU 71 determines that the compression of all files is complete (S17: YES), it ends the mode setting processing (S19).

(1-5) Method of Deciding Subsequent Compression Mode

The method of deciding the subsequent compression mode to be decided upon updating the file statistics table 90 at step S16 is now explained with reference to FIG. 3 and FIG. 10 to FIG. 4.

FIG. 10, FIG. 11, FIG. 13 and FIG. 14 are graphs for deciding the subsequent compression mode.

For instance, a case of deciding the subsequent compression mode of point A shown in FIG. 3 is explained.

File number "10" of point A shows a case where the target value of the compression ratio is 20%, the average value of compression ratios is 24.5%, and the performance of the storage system 1A is attained.

Figure 10:
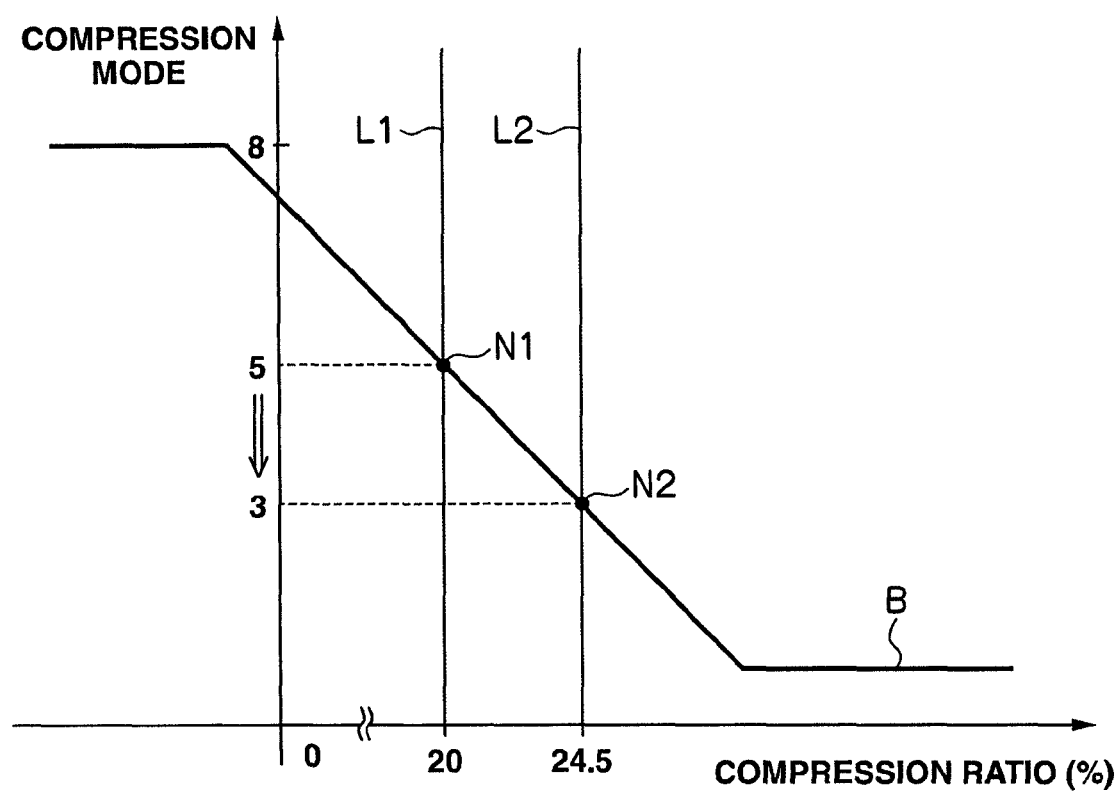
FIG. 10 is a graph for deciding the compression mode when the performance is attained according to an embodiment of the present invention.

The graph of FIG. 10 is the setting method of the subsequent compression mode in a case when the performance of the storage system 1A is attained. The vertical axis represents the compression mode (levels 1 to 8), and the horizontal axis represents the compression ratio (%).

As shown in FIG. 10, when the performance of the storage system 1A is attained, the intersecting point N1 of a reference line B obtained by making the normal distribution created with statistical information based on past compression modes into an approximate straight line and a longitudinal straight line L1 drawn along the target value is set as the current compression mode. The subsequent compression mode is set based on the intersecting point N2 of the reference line B and the longitudinal straight line L2 drawn along the average value up to the current compression ratio. Therefore, the subsequent compression mode is set to "3" once again.

Since the longitudinal straight line L2 drawn along the average value of the compression ratio exceeds the longitudinal straight line L1 drawn along the target value, it is necessary to give priority to performance rather than compression. This implies that the compression mode will be set to the performance priority mode (S8).

A case of deciding the subsequent compression mode of point B shown in FIG. 3 is now explained.

File number "6" of B point shows a case where the target value of the compression ratio is 20%, the average value of compression ratios is 19.1%, and the performance of the storage system 1A is attained.

Figure 11:
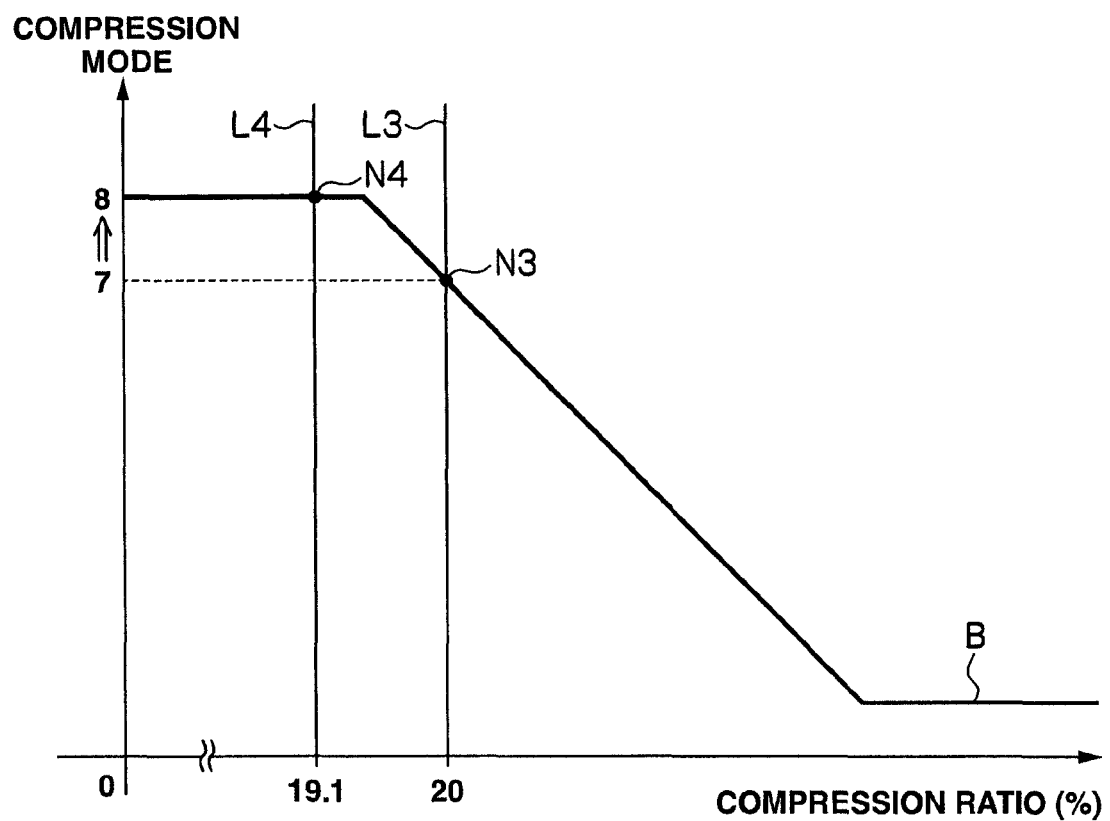
FIG. 11 is a graph for deciding the compression mode when the performance is attained according to an embodiment of the present invention.

The graph of FIG. 11, as with the graph of FIG. 10, is the setting method of the subsequent compression mode in a case when the performance of the storage system 1A is attained.

As shown in FIG. 11, when the performance of the storage system 1A is attained, the intersecting point N3 of the reference line B and the longitudinal straight line L3 drawn along the target value is set as the current compression mode. The subsequent compression mode is set based on the intersecting point N4 of the reference line B and the longitudinal straight line L4 drawn along the average value up to the current compression ratio. Therefore, the subsequent compression mode is set to "8" once again.

Since the longitudinal straight line L4 drawn along the average value of the compression ratio falls below the longitudinal straight line L3 drawn along the target value, it is necessary to give preference to compression rather than performance. This implies that the compression mode will be set to the compression priority mode (S7).

The method of deciding the subsequent compression mode in a case where the performance of the storage system 1A is unattained is now explained.

FIG. 12 shows the file statistics table 90 in a case when the performance of the storage system 1A is unattained.

For instance, a case of deciding the subsequent compression mode of point C is explained.

File number "10" of C point shows a case where the target value of the compression ratio is 20%, the average value of compression ratios is 24.5%, and the performance of the storage system 1A is unattained.

Figure 13:
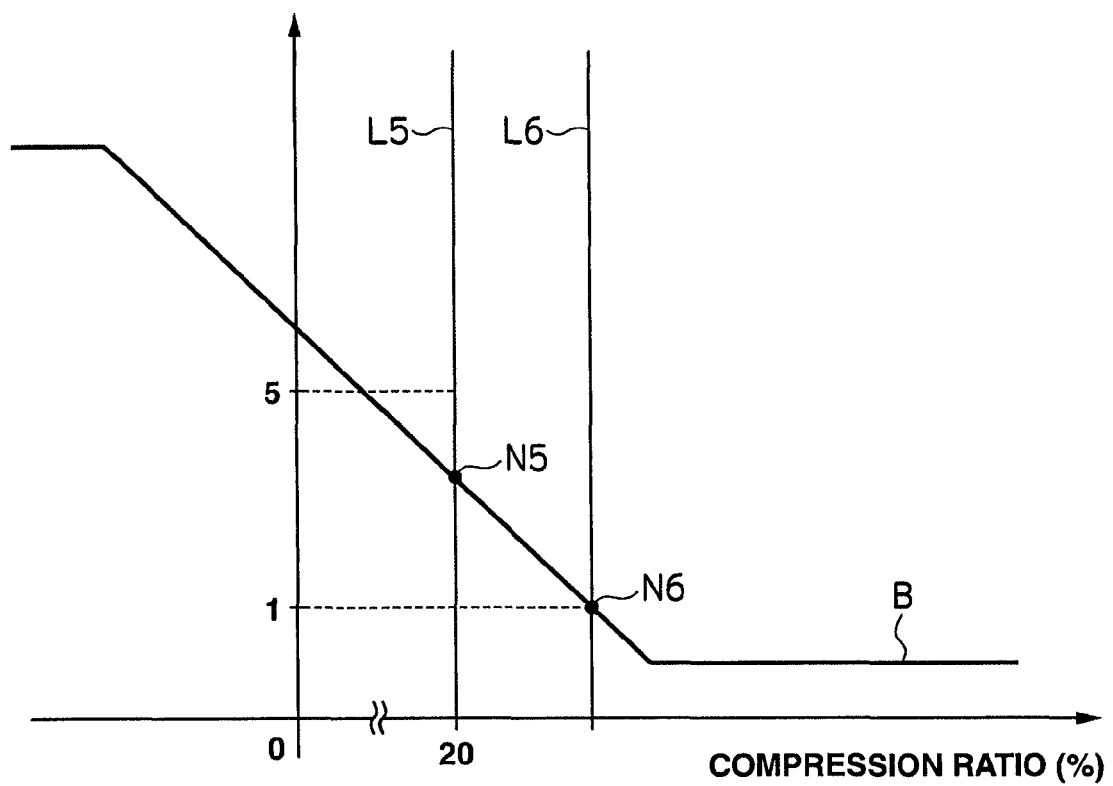
FIG. 13 is a graph for deciding the compression mode when the performance is unattained according to an embodiment of the present invention.

The graph of FIG. 13 is the setting method of the subsequent compression mode in a case when the performance of the storage system 1A is unattained. The vertical axis represents the compression mode (levels 1 to 8), and the horizontal axis represents the compression ratio (%).

As shown in FIG. 13, when the performance of the storage system 1A is unattained, the intersecting point N5 of the reference line B and the longitudinal straight line L5 drawn along the target value is not set as the current compression mode. The subsequent compression mode is set based on the intersecting point N6 of the reference line B and the longitudinal straight line L6 drawn along the average value up to the current compression ratio. Therefore, the subsequent compression mode is set to "1" once again. Based on the result of this compression mode, the file to be subject to subsequent data compression will be set to the performance priority mode (S8).

A case of deciding the subsequent compression mode of point D shown in FIG. 12 is now explained. File number "6" of D point shows a case where the target value of the compression ratio is 20%, the average value of the compression ratio is 19.1%, and the performance of the storage system 1A is unattained.

Figure 14:
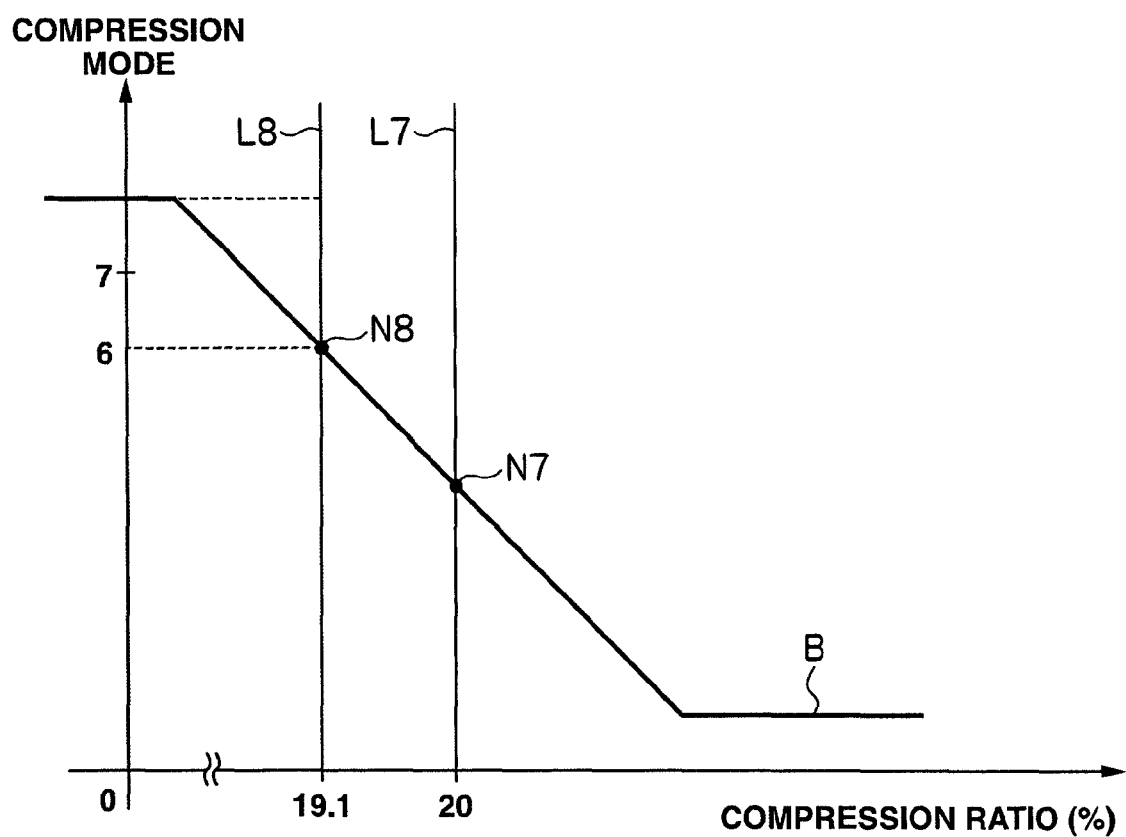
FIG. 14 is a graph for deciding the compression mode when the performance is unattained according to an embodiment of the present invention.

As shown in FIG. 14, when the performance of the storage system 1A is unattained, the intersecting point N7 of the reference line B and the longitudinal straight line L7 drawn along the target value is not set as the current compression mode. The subsequent compression mode is set based on the intersecting point N8 of the reference line B and the longitudinal straight line L8 drawn along the average value up to the current compression ratio. Therefore, the subsequent compression mode is set to "6" once again. Based on the result of this compression mode, the file to be subject to subsequent data compression will be set to the compression priority mode (S7).

Incidentally, the method of deciding the subsequent compression mode upon updating the data statistics table 91 at step S11 is the same as the method of deciding the subsequent compression mode upon updating the file statistics table 90, and the detailed explanation thereof is omitted.

(1-6) Compression Processing

The compression processing to be performed by the compression controller 75 that received the current compression mode from the CPU 71 at step S9 is now explained. This compression processing is hardware processing.

Figure 15:
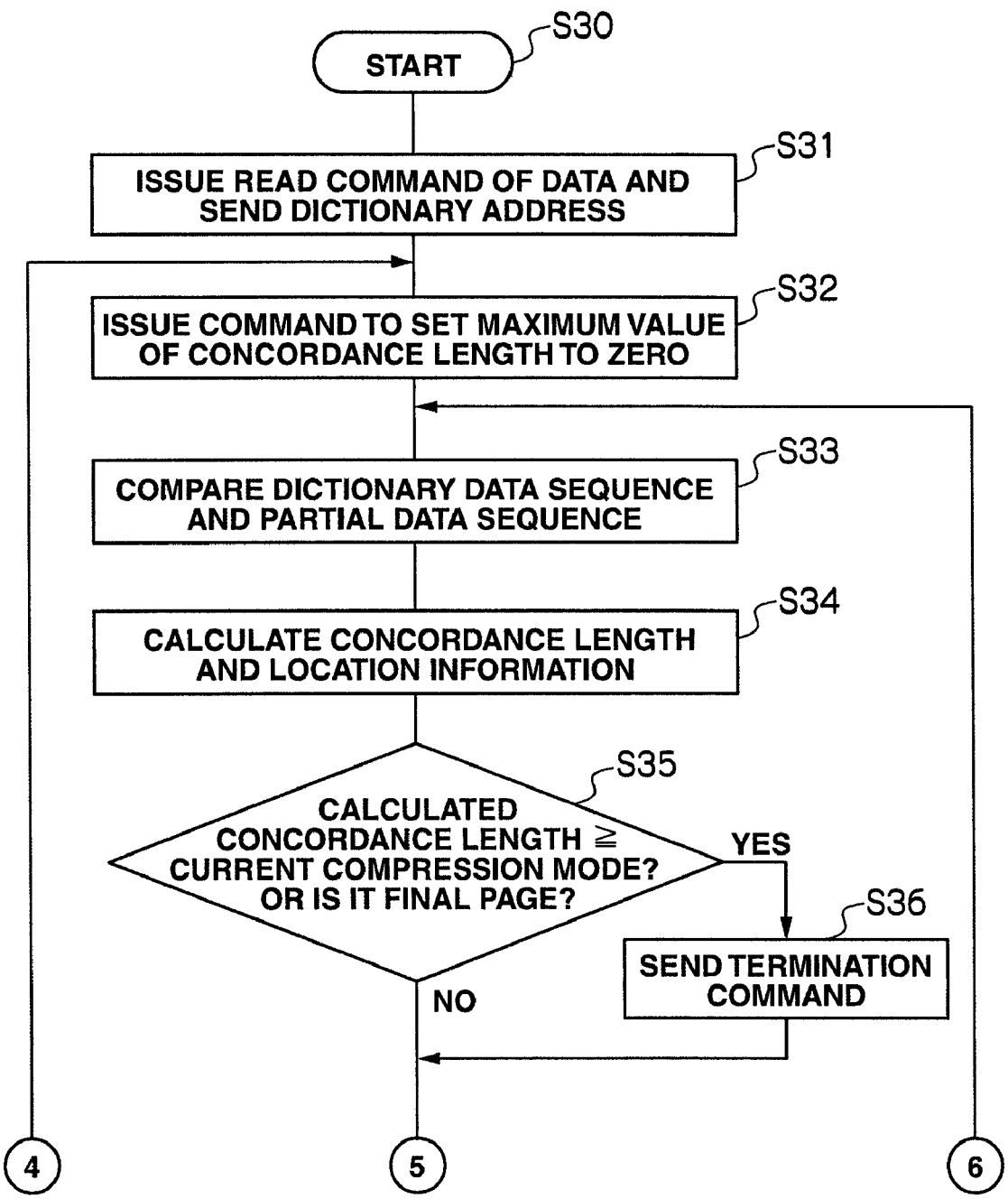
FIG. 15 is a flowchart of compression processing according to an embodiment of the present invention.
Figure 16:
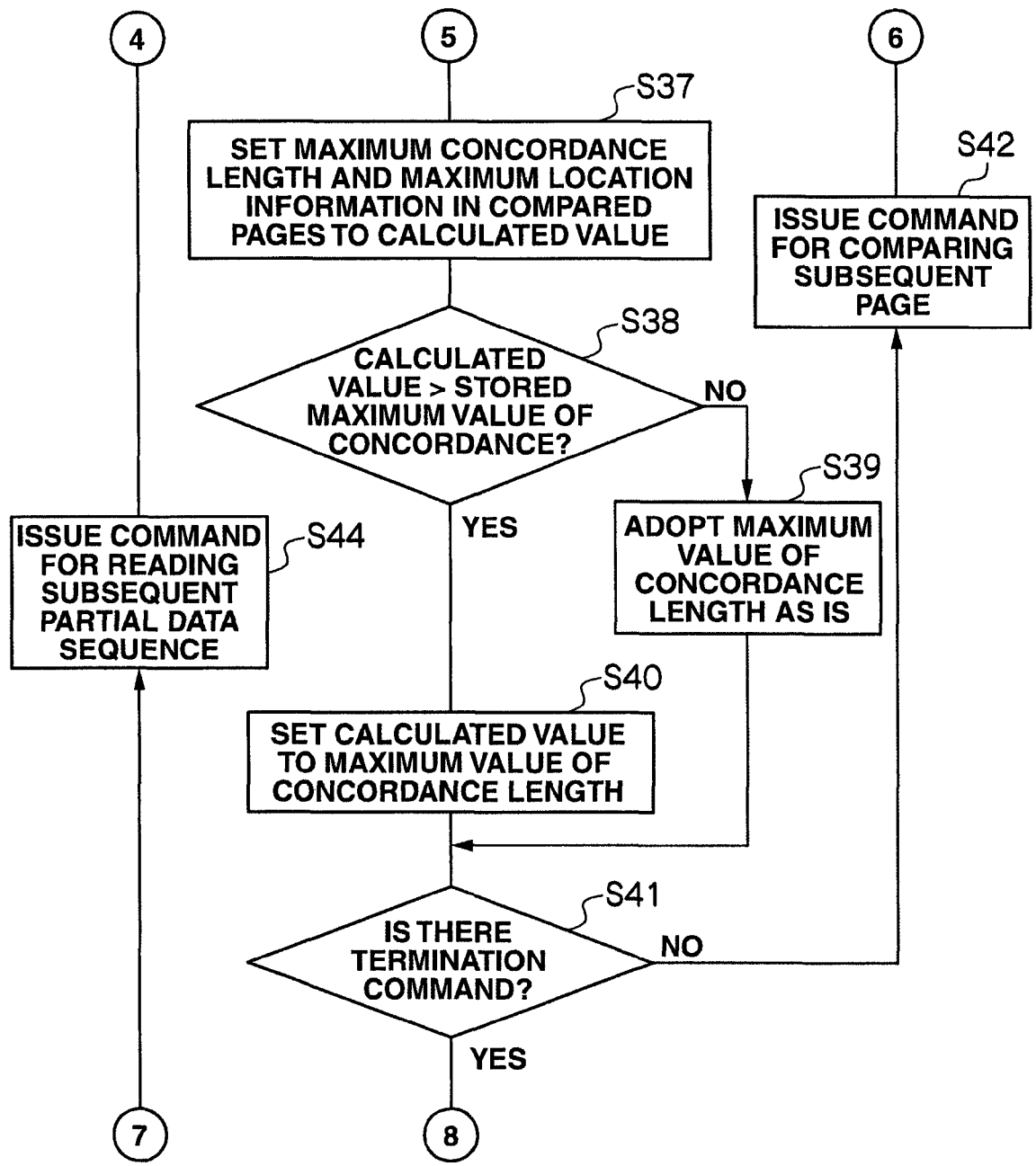
FIG. 16 is a flowchart of compression processing according to an embodiment of the present invention.
Figure 17:
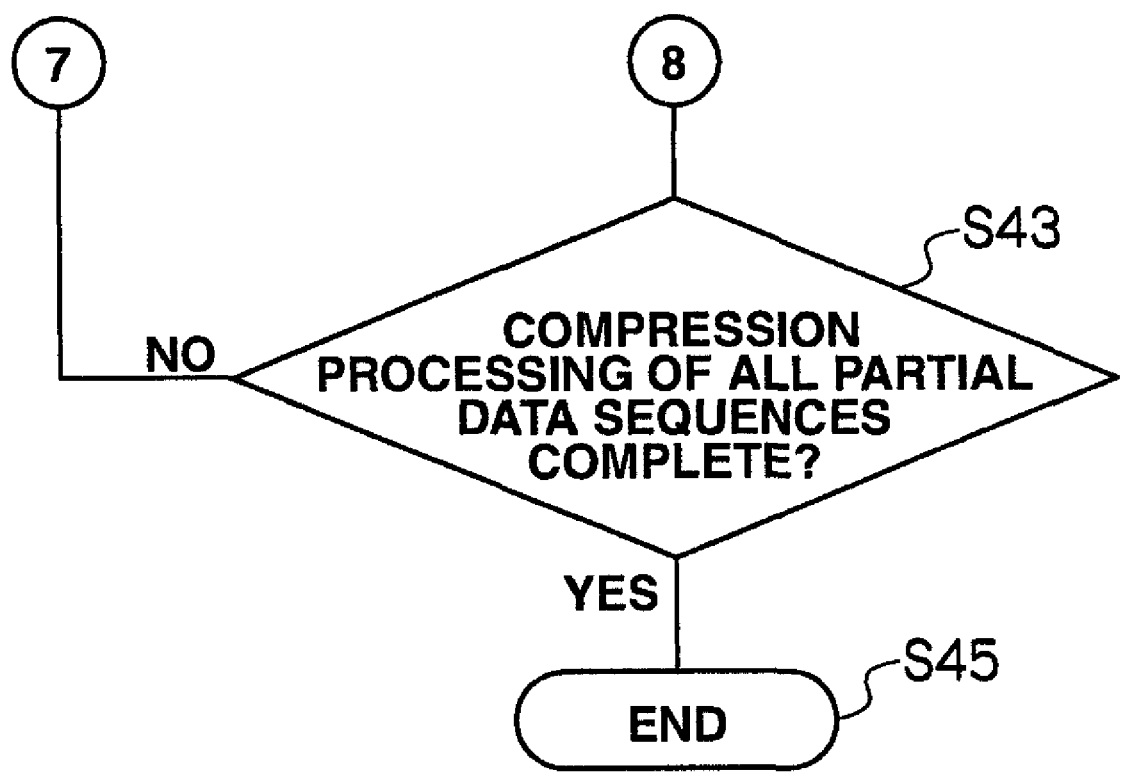
FIG. 17 is a flowchart of compression processing according to an embodiment of the present invention.

Specifically, as shown in FIG. 15 and FIG. 16, when the termination controller 750 receives a compression processing start command from the CPU 71, it starts the compression processing (S30).

The termination controller 750 causes the encryption unit 752 to read input data as file data, and encrypts such data as an input data sequence. Subsequently, the termination controller 750 sends the dictionary address stored in the dictionary unit 751 to the dictionary unit 751 (S31).

When the dictionary unit 751 receives the dictionary address, it sets the address pointer 751A to the start address of one group dictionary data sequence grouped into the dictionary data sequences D0 to D14, D8 to, . . . Dn+14. Here, a case is explained where the address pointer 751A is set to the dictionary data sequence D8. The encryption unit 752 divides the input data sequence into partial data sequences, and outputs the initial partial data sequences I0 to I7 to the concordance detection unit 753. The compression target data range of the initial partial data sequences I0 to I7 and the initial dictionary data sequence D8 to D22 is set as page P1.

Subsequently, when the termination controller 750 issues a command to the memory unit 754 to set the maximum value of concordance length in page P1 to zero, the memory unit 754 performs initialization by setting the maximum value of concordance length to zero (S32).

The concordance detection unit 753 compares the initial dictionary data sequences D0 to D22 set with the address pointer 751A to compress the inside of page P1, and the initial partial data sequences I0 to I7 divided with the encryption unit 752 (S33).

When the concordance detection unit 753 calculates the concordance length and the location information (S34), it sends the calculation result to the memory unit 754. When the memory unit 754 receives and stores the calculation result, it sends the calculation result to the termination controller 750.

The termination controller 750 that received the calculation result determines whether the calculated concordance length is greater than the current compression mode, or whether it is the final page (S35).

When the termination controller 750 determines that the calculated concordance length is greater than the current compression mode or is the final page (S35: YES), it sends a termination command to the dictionary unit 751 and the encryption unit 752 (S36), and sets the maximum concordance length and its location information in the compared page P1 as the calculated value (S37). The dictionary unit 751 and the encryption unit 752 that received this command terminate the comparison in the currently compressed page P1.

When the termination controller 750 determines that the calculated concordance length is smaller than the current compression mode or is not the final page Pn (S35: NO), it sets the maximum concordance length and its location information in the compared page P1 as the calculated value (S37). The termination controller 750 stores the calculated value in the memory unit 754.

For example, when the calculated concordance length is "3" and the current compression mode is set to "5," compression is not terminated, and the routine proceeds to the processing routine of step S37. When the maximum concordance length and the maximum location information in page P1 are (4, D13), the calculated value will be "4." Thereafter, the past maximum value of concordance length and calculated value in page P1 stored in the memory unit 754 are compared.

The termination controller 750 determines whether the calculated value is a value that is greater than the maximum value of concordance length (S38). When the termination controller 750 determines that the calculated value is a value that is smaller than the maximum value of concordance length (S38: NO), it directly stores the maximum value of concordance length in the memory unit 754.

Meanwhile, when the termination controller 750 determines that the calculated value is a value that is greater than the maximum value of concordance length (S38: YES), it sets the calculated value as the new maximum value of concordance length, and stores the new maximum value of concordance length in the memory unit 754 (S40).

The termination controller 750 determines whether a termination command has been issued to the dictionary unit 751 and the encryption unit 752 (S41). When the termination controller 750 determines that a termination command has not been issued (S41: NO), it sends the comparison command of the subsequent page P2 to the dictionary unit 751 and the encryption unit 752 (S42), and executes step S33 once again.

Specifically, when the dictionary unit 751 receives the dictionary address from the termination controller 750, it sets the address pointer 751A to the start address D16 of the dictionary data sequences D0 to Dn+14. The encryption unit 752 directly outputs the initial partial data sequences I0 to I7 to the concordance detection unit 753. The concordance detection unit 753 compares the dictionary data sequences D16 to D30 and the initial partial data sequences I0 to I7 (S33).

Meanwhile, when the termination controller 750 determines that a termination command has been issued to the dictionary unit 751 and the encryption unit 752 (S41: YES), it determines whether the compression processing of all plurality of partial data sequences obtained by dividing the input data sequence is complete (S43).

When the termination controller 750 determines that the compression processing of all plurality of partial data sequences I0 to I7 is not complete (S43: NO), it issues a read command to the encryption unit 752 to read the subsequent partial data sequences I0 to I7 (S44). The encryption unit 752 that received this read command outputs the subsequent partial data sequences I0 to I7 to the concordance detection unit 753. The processing at step S32 is executed once again.

The termination controller 750 determines whether the compression processing of all partial data sequences I0 to I7 in the file is complete (S43: YES), it ends the compression processing (S45).

The termination controller 750 sends a report indicating that the compression processing is complete to the CPU 71. The CPU 71 executes step S10 explained at FIG. 9.

As explained above, the current compression mode is decided by selecting a compression priority mode or a performance priority mode of the storage system. In addition, by comparing the calculated value and current compression mode for each page, the termination controller 750 is able to adjust the termination of data compression for each page based on the status of performance and compression since the maximum concordance length will be constantly updated. It is thereby possible to adjust the compression processing time in the storage system 1A.

(1-7) Effect of Present Embodiment

According to the present embodiment, it is possible to avoid the deterioration in performance of the storage system since the compression processing time can be adjusted by selecting either the compression priority mode or the performance priority mode of the storage system in the storage subsystem upon compression data.

(2) Other Embodiments

According to the configuration of the foregoing embodiment, the compression controller 75 and the encryption/decryption controller 76 are connected between the data transfer controller 73 and the cache memory 74.

Figure 18:
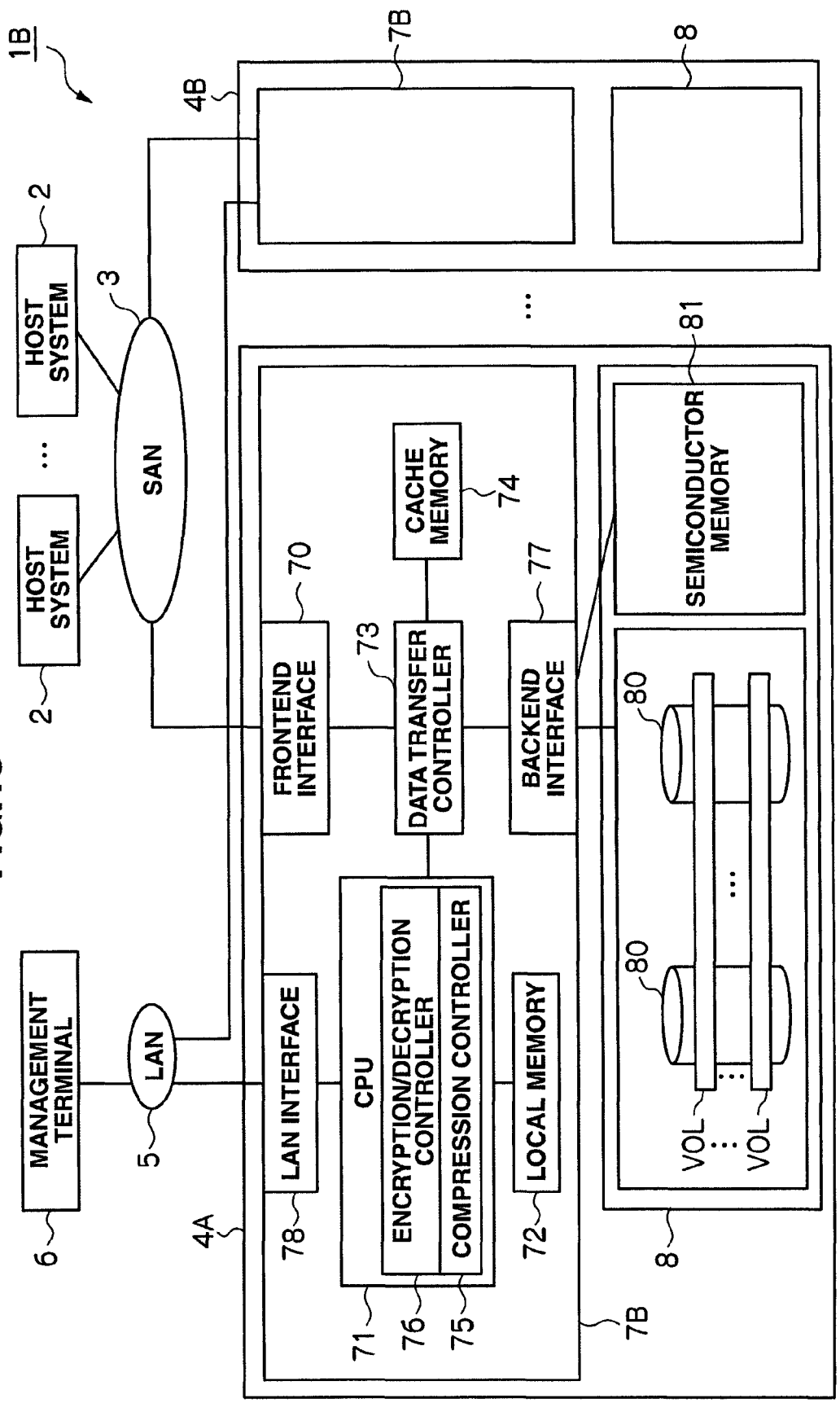
FIG. 18 is a block diagram showing the overall configuration of a storage system according to another embodiment of the present invention.

As shown in FIG. 18, the compression controller 75 and the encryption/decryption controller 76 in the controller 7B may also be mounted in the CPU 71.

Figure 19:
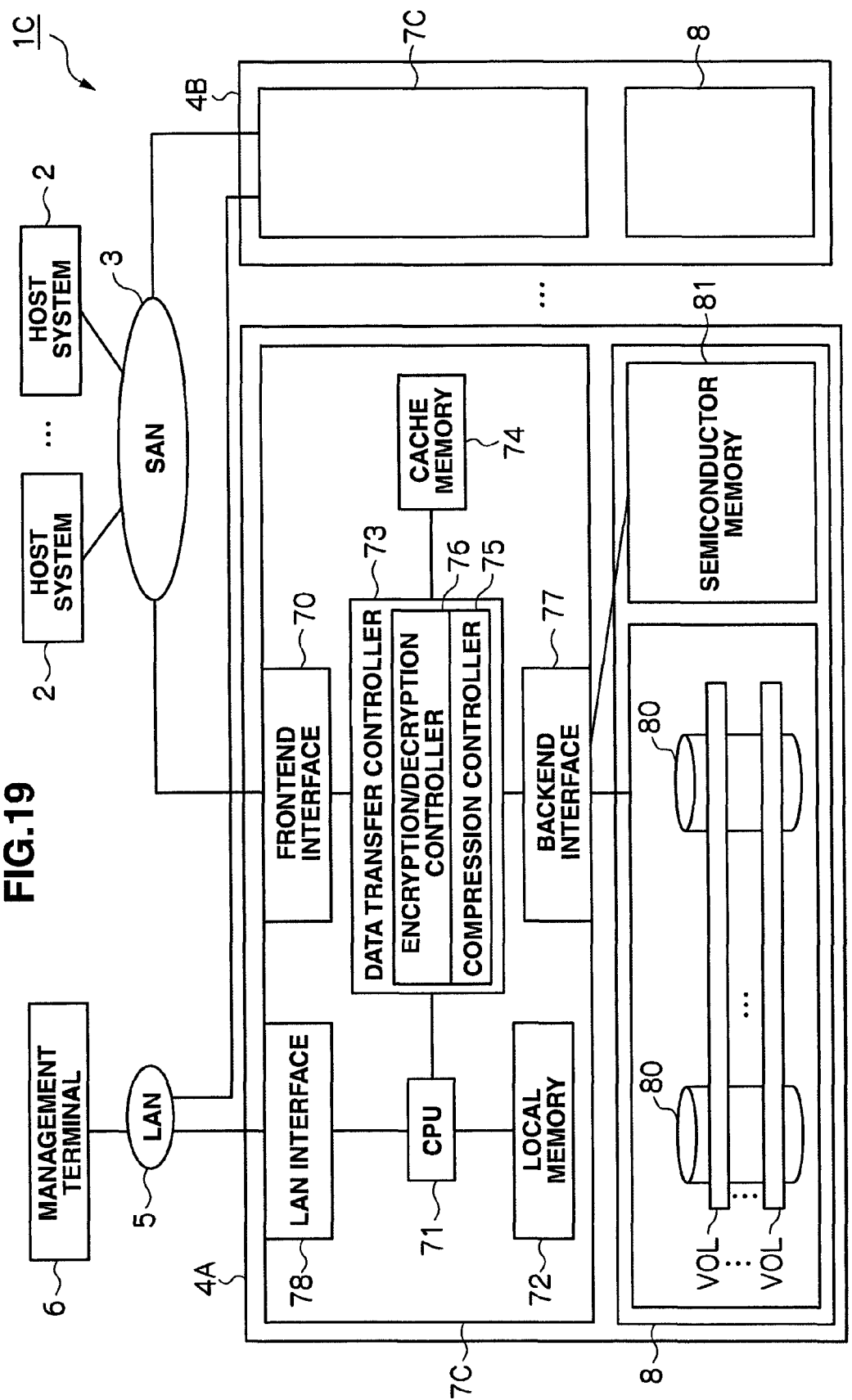
FIG. 19 is a block diagram showing the overall configuration of a storage system according to another embodiment of the present invention.

As shown in FIG. 19, the compression controller 75 and the encryption/decryption controller 76 in the controller 7C may also be mounted in the data transfer controller 73.

Figure 20:
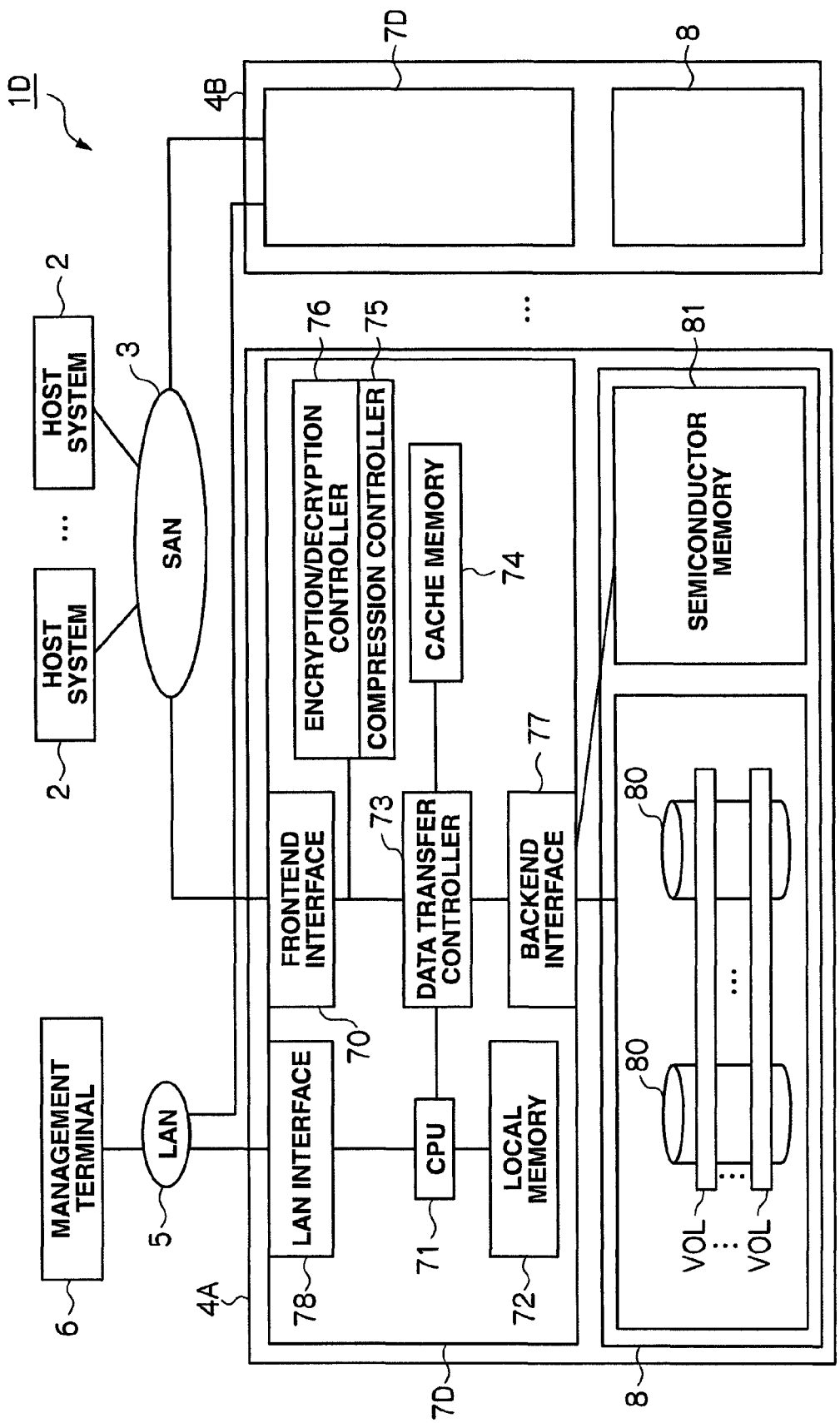
FIG. 20 is a block diagram showing the overall configuration of a storage system according to another embodiment of the present invention.
Figure 21:
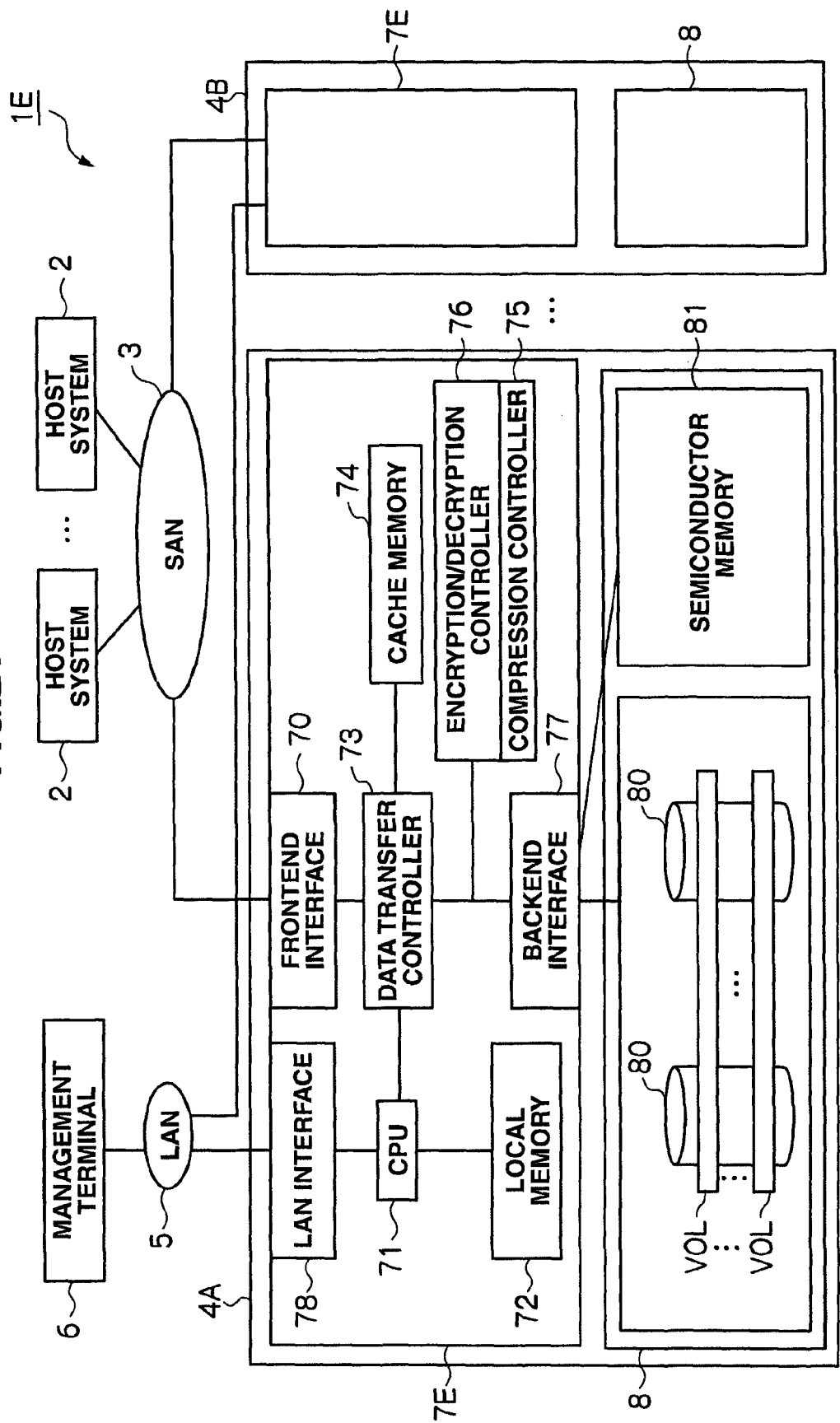
FIG. 21 is a block diagram showing the overall configuration of a storage system according to another embodiment of the present invention.

As shown in FIG. 20 or FIG. 21, the compression controller 75 and the encryption/decryption controller 76 in the controllers 7D, 7E may also be connected between the frontend interface 70 and the data transfer controller 73, or connected between the data transfer controller 73 and the backend interface 77.

Any configuration of the storage systems 1B to 1E shown in FIG. 18 to FIG. 21 is able to avoid the deterioration in performance of the storage system since the compression processing time can be adjusted by selecting either the compression priority mode or the performance priority mode of the storage system in the storage subsystem 4 upon compression data.

Incidentally, excluding the connective configuration or built-in configuration of the compression controller 75 and the encryption/decryption controller 76 shown in FIG. 18 to FIG. 21, components with the same reference numerals have the same configuration and perform the same processing as the foregoing embodiment, the detailed explanation thereof is omitted.

Further, although the one or more storage controllers (storage subsystems) store a statistical information management unit for managing a throughput value decided based on statistical information of previously compressed file data as a system performance value, and a mode setting unit for setting a compression mode of either a system performance priority mode that terminates compression of the file data and gives priority to system performance or a compression priority mode that gives priority to compression of the file data based on a comparison between a system performance target value preset as a target value and the system performance value in the local memory 72, the statistical information management unit and the mode setting unit may be configured as independent hardware.

The present invention may be broadly applied to storage controllers (storage subsystems) comprising one or more storage subsystems, or storage systems of various other modes.

What is claimed is:

1. A storage system comprising:
one or more storage controllers for storing file data, comprising data that has been sent from a host system and arranged in a plurality of files, each file having a size and attribute, that is to be compressed,
wherein said one or more storage controllers comprise:
a master unit responsive to a user input for setting a common compression ratio target value and performance target value in the storage system;
a measurement unit for measuring a throughput value and compression ratio for each file;
a statistical information management unit for managing a throughput value for each file as decided based on statistical information of previously compressed file data as a system performance value;
a mode setting unit for setting for each file a compression mode of either (1) a system performance priority mode that terminates compression of said file data and gives priority to system performance or (2) a compression priority mode, indicating a level of priority given to compression, which is determined in relation to performance, that gives priority to compression of said file data based on a comparison between a system performance target value preset as a target value and said system performance value;
a compression controller for compressing said file data in each file, based on said compression mode set with said mode setting unit; and
a subsequent file compression mode decision unit which is executed, when the compression priority mode of a first file is set to a first priority mode, to change the compression priority mode of the first priority mode according to the conditions (a)-(d) below:
 (a) if the throughput value of the first file attains the performance target value of the system and the compression ratio of the first file attains the compression ratio target value, the first priority mode is changed to a second priority mode giving a priority to compression;
 (b) if the throughput value of the first file attains the performance target value of the system and the compression ratio of the first file fails to attain the compression ratio target value, the first priority mode is changed to a second priority giving a priority to performance;
 (c) if the throughput value of the first file fails to attain the performance target value of the system and the compression ratio of the first file attains the compression ratio target value, the first priority mode is changed to a second priority mode giving a priority to performance; and
 (d) if the throughput value of the first file fails to attain the performance target value of the system and the compression ratio of the first file fails to attain the compression ratio target value, the first priority mode is changed to a second priority mode giving a priority to compression.

2. The storage system according to claim 1,
wherein said compression controller comprises:
a concordance detection unit for detecting a location of concordance between an input data sequence obtained by encrypting said file data, and a dictionary data sequence as a previously encrypted input data sequence; and
a termination controller for controlling termination of compression of said file data based on a comparison between said compression mode and said location of concordance.

3. The storage system according to claim 2,
wherein said subsequent file compression mode decision unit is operative to decide a compression mode of subsequent file data based on statistical information of file data compressed with said compression controller.

4. The storage system according to claim 3,
wherein said subsequent file compression mode decision unit decides an intersecting point of a reference line created based on compression ratios of previous file data and an average value of compression ratios up to current file data as a compression mode of subsequent file data.

5. The storage system according to claim 2,
wherein said compression controller comprises:
an encryption unit for encrypting said file data as an input data sequence; and
a dictionary unit for setting a previously encrypted input data sequence as a dictionary data sequence.

6. One or more storage controllers for storing file data, comprising data that has been sent from a host system and arranged in a plurality of files, each file having a size and attribute, that is to be compressed, comprising:
a master unit responsive to a user input for setting a common compression ratio target value and performance target value in the storage system;
a measurement unit for measuring a throughput value and compression ratio for each file;
a statistical information management unit for managing a throughput value for each file as decided based on statistical information of previously compressed file data as a system performance value;
a mode setting unit for setting for each file a compression mode of either (1) a system performance priority mode that terminates compression of said file data and gives priority to system performance or (2) a compression priority mode, indicating a level of priority given to compression, which is determined in relation to performance, that gives priority to compression of said file data based on a comparison between a system performance target value preset as a target value and said system performance value;
a concordance detection unit for detecting a location of concordance between an input data sequence obtained by encrypting said file data in each file, and a dictionary data sequence as a previously encrypted input data sequence;
a termination controller for controlling termination of compression of said file data in each file based on a comparison between said compression mode and said location of concordance; and
a subsequent file compression mode decision unit which is executed, when the compression priority mode of a first file is set to a first priority mode, to change the compression priority mode of the first priority mode according to the conditions (a)-(d) below:
  (a) if the throughput value of the first file attains the performance target value of the system and the compression ratio of the first file attains the compression ratio target value, the first priority mode is changed to a second priority mode giving a priority to compression;
  (b) if the throughput value of the first file attains the performance target value of the system and the compression ratio of the first file fails to attain the compression ratio target value, the first priority mode is changed to a second priority giving a priority to performance;
  (c) if the throughput value of the first file fails to attain the performance target value of the system and the compression ratio of the first file attains the compression ratio target value, the first priority mode is changed to a second priority mode giving a priority to performance; and
  (d) if the throughput value of the first file fails to attain the performance target value of the system and the compression ratio of the first file fails to attain the compression ratio target value, the first priority mode is changed to a second priority mode giving a priority to compression.

7. The storage controller according to claim 6, wherein said subsequent file compression mode decision unit is operative to decide a compression mode of subsequent file data based on a comparison between said location of concordance and a location of maximum concordance.

8. The storage controller according to claim 7,
wherein subsequent file compression mode decision unit decides an intersecting point of a reference line created based on compression ratios of previous file data and an average value of compression ratios up to current file data as a compression mode of subsequent file data.

9. A data compression method of a storage system comprising one or more storage controllers for storing file data, comprising data that has been sent from a host system and arranged in a plurality of files, each file having a size and attribute, that is to be compressed,
wherein said one or more storage controllers performs:
a step, responsive to a user input, of setting a common compression ratio target value and performance target value in the storage system;
a measurement step of measuring a throughput value and compression ratio for each file;
a statistical information management step of managing a throughput value decided based on statistical information of previously compressed file data as a system performance value;
a mode setting step of setting for each file a compression mode of either (1) a system performance priority mode that terminates compression of said file data and gives priority to system performance or (2) a compression priority mode, indicating a level of priority given to compression, which is determined in relation to performance, that gives priority to compression of said file data based on a comparison between a system performance target value preset as a target value and said system performance value;
a compression control step of compressing said file data in each file based on said compression mode set at said mode setting step; and
a subsequent file compression mode decision unit which is executed, when the compression priority mode of a first file is set to a first priority mode, to change the compression priority mode of the first priority mode according to the conditions (a)-(d) below:
  (a) if the throughput value of the first file attains the performance target value of the system and the compression ratio of the first file attains the compression ratio target value, the first priority mode is changed to a second priority mode giving a priority to compression;
  (b) if the throughput value of the first file attains the performance target value of the system and the compression ratio of the first file fails to attain the compression ratio target value, the first priority mode is changed to a second priority giving a priority to performance;
  (c) if the throughput value of the first file fails to attain the performance target value of the system and the compression ratio of the first file attains the compression ratio target value, the first priority mode is changed to a second priority mode giving a priority to performance; and
  (d) if the throughput value of the first file fails to attain the performance target value of the system and the compression ratio of the first file fails to attain the compression ratio target value, the first priority mode is changed to a second priority mode giving a priority to compression.

10. The data compression method according to claim 9, wherein said one or more storage controllers further comprise:

a concordance detection step of detecting a location of concordance between an input data sequence obtained by encrypting said file data in each file, and a dictionary data sequence as a previously encrypted input data sequence; and a termination control step of controlling termination of compression of said file data in each file based on a comparison between said compression mode and said location of concordance.

11. The data compression method according to claim 10, wherein said subsequent file compression mode decision step decides a compression mode of subsequent file data based on statistical information of file data compressed at said compression control step.

12. The data compression method according to claim 11, wherein, at said subsequent file compression mode decision step, an intersecting point of a reference line created based on compression ratios of previous file data and an average value of compression ratios up to current file data is decided as a compression mode of subsequent file data.

13. The data compression method according to claim 10, wherein said one or more storage controllers further perform:

an encryption step of encrypting said file data as an input data sequence; and a dictionary step of setting a previously encrypted input data sequence as a dictionary data sequence.

* * * * *